United States Patent
Kniazzeh et al.

(10) Patent No.: US 6,417,911 B1
(45) Date of Patent: Jul. 9, 2002

(54) PROCESSING FLUID SPREAD SYSTEM FOR AN ELECTRONIC PHOTOGRAPHIC PRINTER AND CAMERA AND RELATED METHOD THEREOF

(75) Inventors: Alfredo G. Kniazzeh, Waltham; Bruce K. Johnson, North Andover; Margaret A. Obermiller, Wayland, all of MA (US)

(73) Assignee: Polaroid Corporation, Cambridge, MA (US)

( * ) Notice: Subject to any disclaimer, the term of this patent is extended or adjusted under 35 U.S.C. 154(b) by 0 days.

(21) Appl. No.: 09/495,025

(22) Filed: Jan. 31, 2000

(51) Int. Cl.⁷ .................. G03B 27/32; G03B 17/50; G03D 9/02
(52) U.S. Cl. ............ 355/27; 396/30; 396/32; 396/33; 396/583
(58) Field of Search .............. 396/30, 31, 32, 396/33, 42, 583, 580; 355/27

(56) References Cited

U.S. PATENT DOCUMENTS

| | | | |
|---|---|---|---|
| 2,977,226 A | 3/1961 | Land .................. 96/3 |
| 2,991,703 A | 7/1961 | Eloranta .................. 95/13 |
| 3,165,048 A | 1/1965 | Hamilton .................. 95/89 |
| 3,222,170 A | 12/1965 | Eloranta .................. 96/29 |
| 3,241,468 A | 3/1966 | Wolff .................. 95/13 |
| 3,245,335 A | 4/1966 | Sable .................. 95/89 |
| 3,416,427 A | 12/1968 | Murphy .................. 95/89 |
| 3,625,129 A | 12/1971 | Van Allen .................. 95/89 R |
| 3,647,441 A | 3/1972 | Bachelder .................. 96/29 |
| 3,742,834 A | 7/1973 | Thoenen .................. 95/13 |
| 3,776,118 A | 12/1973 | Driscoll et al. .................. 95/89 |
| 3,777,647 A | 12/1973 | Land .................. 95/89 |
| 3,779,144 A | 12/1973 | Paglia .................. 95/14 |
| 3,779,770 A | 12/1973 | Alston et al. .................. 96/76 C |
| 3,829,871 A | 8/1974 | Gold .................. 354/86 |
| 3,832,731 A | 8/1974 | Kinsman .................. 354/304 |
| 3,852,781 A | 12/1974 | Erlichman .................. 354/86 |
| 3,877,042 A | 4/1975 | Douglas .................. 354/86 |
| 3,925,800 A | 12/1975 | Whall .................. 354/301 |
| 3,943,786 A | 3/1976 | Mills .................. 74/384 |
| 4,016,578 A | 4/1977 | Friedman .................. 354/86 |
| 4,020,498 A | 4/1977 | Friedman .................. 354/86 |
| 4,047,192 A | 9/1977 | Johnson et al. .................. 354/83 |
| 4,087,831 A | 5/1978 | Bendoni |
| 4,104,669 A | 8/1978 | Friedman .................. 354/304 |
| 4,134,655 A | 1/1979 | Friedman .................. 354/86 |
| 4,174,164 A | 11/1979 | Friedman et al. .................. 354/86 |
| 4,247,180 A | 1/1981 | Norris .................. 352/82 |
| 4,253,757 A | 3/1981 | Frieman et al. .................. 354/304 |
| 4,319,827 A | 3/1982 | Carter et al. .................. 354/306 |
| 4,558,936 A | 12/1985 | Petersen .................. 354/86 |
| 4,568,167 A | 2/1986 | Sorli .................. 354/304 |
| 4,811,118 A | 3/1989 | Katoh et al. .................. 358/311 |
| 4,823,154 A | 4/1989 | Sturgis .................. 354/86 |
| 4,839,676 A | 6/1989 | Lippert et al. .................. 354/86 |
| 4,847,632 A | 7/1989 | Norris .................. 346/107 |
| 4,855,769 A | 8/1989 | Slavitter et al. .................. 354/21 |
| 4,868,586 A | * 9/1989 | Norris .................. 346/145 |
| 4,937,676 A | 6/1990 | Finelli et al. .................. 358/229 |
| 5,032,911 A | 7/1991 | Takimoto .................. 358/76 |
| 5,049,907 A | 9/1991 | Fraser et al. .................. 354/86 |
| 5,151,728 A | 9/1992 | Hendry et al. .................. 354/83 |
| 5,473,370 A | 12/1995 | Moronaga et al. .................. 348/231 |
| 5,715,234 A | 2/1998 | Stephenson et al. .................. 396/429 |
| 5,715,492 A | 2/1998 | Stephenson .................. 396/429 |
| 5,721,966 A | 2/1998 | Campbell, Jr. et al. .................. 396/42 |
| 5,724,155 A | 3/1998 | Saito .................. 358/402 |
| 5,864,390 A | 1/1999 | Johnson et al. .................. 355/67 |
| 5,982,592 A | 11/1999 | Saito et al. .................. 360/130.31 |
| 5,990,498 A | 11/1999 | Chapnik et al. .................. 257/99 |
| 6,014,202 A | 1/2000 | Chapnik et al. .................. 355/67 |

* cited by examiner

Primary Examiner—Russell Adams
Assistant Examiner—Peter B. Kim

(57) ABSTRACT

A photographic processing fluid spread system, for use with integral type self-processable film unit, by which the thickness of a layer of processing fluid is controlled and restricted in a uniform manner as the processing fluid is spread across preselected portions of the film unit, while the film unit is also simultaneously being progressively exposed and advanced.

25 Claims, 27 Drawing Sheets

FILM EXIT SLOT

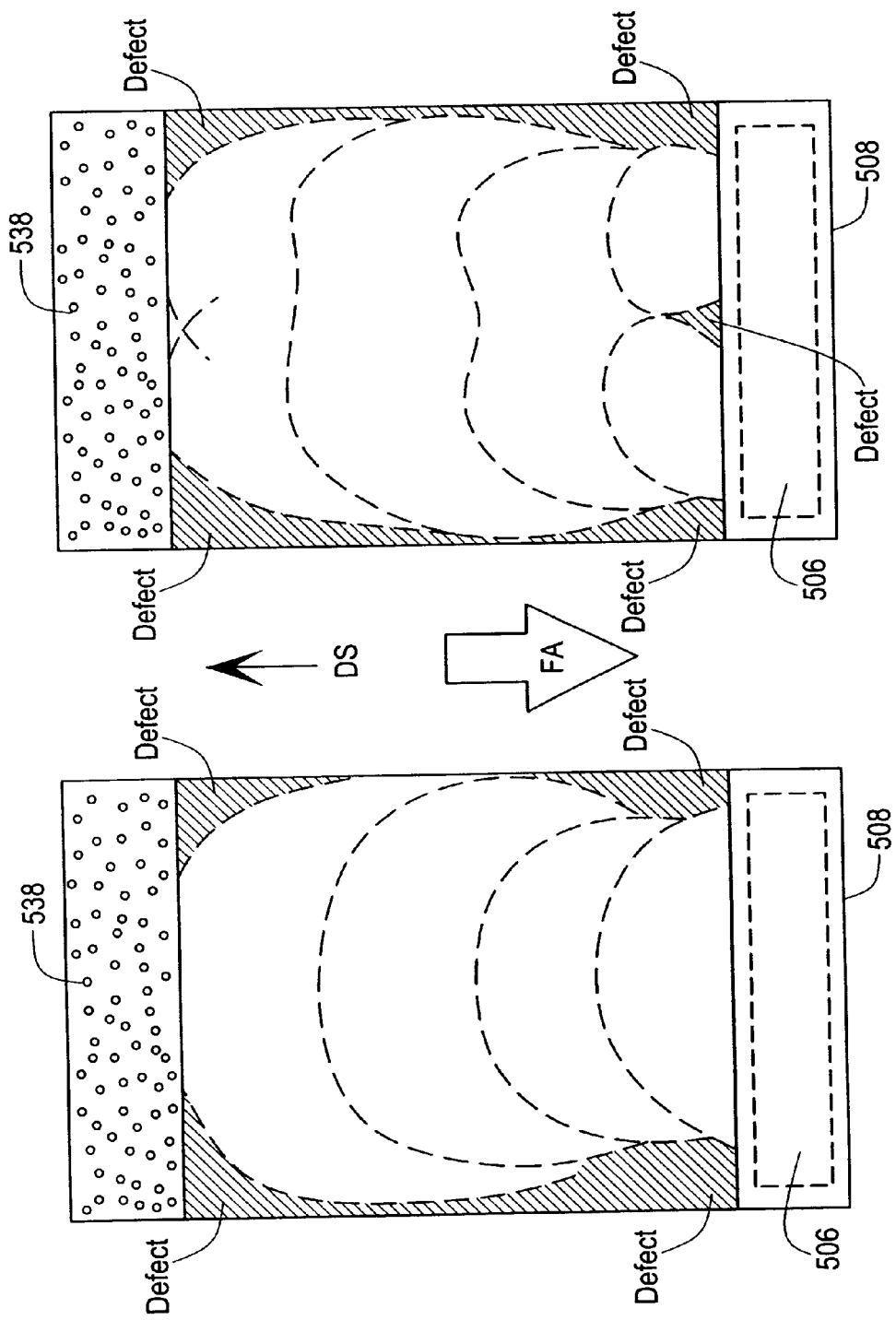

PROCESSING FLUID SPREAD SYSTEM FOR AN ELECTRONIC PHOTOGRAPHIC PRINTER AND CAMERA AND RELATED METHOD THEREOF

CROSS-REFERENCES TO RELATED APPLICATIONS

This application is related to commonly owned U.S. patent application Ser. No. 08/703,985 entitled "Optical System for Use in a Photographic Printer", now U.S. Pat. No. 5,864,390; U.S. patent application Ser. No. 08/931,732 entitled "Apparatus for Reducing Linear Artifacts in Optically Printed-Image", now U.S. Pat. No. 5,982,529; U.S. patent application Ser. No. 08/931,571 entitled "Optical System for Transmitting A Graphical Image", now U.S. Pat. No. 6,014,202; U.S. patent application Ser. No. 08/931,252 entitled "Light-Emitting Diode Having Uniform Irradiance Distribution", now U.S. Pat. No. 5,990,498; U.S. patent application Ser. No. 08/929,972 entitled "Optical System for Use in a Photographic Printer"; U.S. patent application Ser. No. 08/931,570 entitled "Print Head Drive Assembly"; U.S. patent application Ser. No. 08/931,351 entitled "Retractable Print Medium Tray for Use in an Optical Printer"; and U.S. patent application Ser. No. 09/409,795 (being a Divisional of Ser. No. 08/931,571) entitled "Optical System for Transmitting a Graphical Image", of which all of above listed applications and patents are incorporated herein by reference.

This application is also related to commonly owned co-pending U.S. patent application Ser. No. 09/495,029 entitled "Film Unit Drive Assembly for an Electronic Photographic Printer and Camera and Related Method Thereof"; U.S. patent application Ser. No. 09/495,026 entitled "Processing Fluid Spread System for a Detachable Electronic Photographic Printer and Camera"; U.S. patent application Ser. No. 09/495,023 entitled "Film Unit Drive Assembly for a Detachable Electronic Photographic Printer and Camera"; U.S. provisional application Ser. No. 60/179,224 entitled "Lens With Integral Refractive Aperture"; and U.S. provisional application Ser. No. 60/179,131 entitled "Electronic Camera System With Modular Printer and Base", each application listed above are concurrently filed with the present application are incorporated herein by reference.

TECHNICAL FIELD OF THE INVENTION

The present invention generally relates to the field of photography and more specifically to a photographic processing fluid spread system, for use with integral type self-processible film unit, by which the thickness of a layer of processing fluid is controlled and restricted in a uniform manner as the processing fluid is spread across preselected portions of the film unit, while the film unit is also simultaneously being progressively exposed and advanced.

BACKGROUND OF THE INVENTION

An important step in processing a self-developing film unit is the distribution of a fluid, preferably a liquid processing composition between and contact with opposed or superposed sheet-like elements of an exposed self-developing film unit to initiate a diffusion transfer process. In order to obtain an optimum quality positive print, the distributed layer of processing composition should cover the entire photoexposed area and be uniform in thickness.

The film unit comprises a first sheet-like element having one or more photosensitive layers thereon and a second sheet-like element having one or more image-receiving layers thereon. These first and second sheet-like elements form a laminate and the photosensitive layer or layers are exposed through a transparent section of one of the sheet-like elements. The image-receiving layer or layers are incorporated in the laminate and subsequent to the fluid distribution, the positive print may be viewed through the same transparent section of the film unit.

The film unit includes a rupturable container or pod of fluid processing composition at one end of the film unit from which the fluid is dispensed and distributed in a thin layer in response to passing the film unit's pod, between a pair of pressure applying members.

In a typical self-developing photographic system, the film units are arranged in stacked relation within a film container which is adapted to be inserted into the receiving chamber of an appropriate camera to locate the forwardmost film unit in the stack in position for exposure.

Subsequent to exposure, the forwardmost film unit is advanced through a withdrawal slot in the container, pod first, and into engagement with a pair of pressure applying members mounted within the camera. The pressure applying members exert a compressive force on the pod causing it to rupture and discharge the fluid between the predetermined adjacent layers at the leading end of the photo-exposed area. Continued advancement of the film unit between the pressure applying members results in the fluid being advanced along a liquid wave front toward the trailing end of the film unit such that it is progressively distributed over the entire photo-exposed area of the film unit.

The uniformity of the liquid layer is, to a large degree, determined by the initial shape of the liquid wave front. In order to uniformly spread the processing composition over a substantially rectangular or square photo-exposed area, it is preferable that the wave front be disposed in a substantially straight line which extends outwardly to the lateral margins of the area and is oriented in a direction that is normal to the direction of film advancement between the pressure applying members.

There are several factors which affect the initial shape of the wave front. One is a design of the pod and its rupture characteristics. Another relates to the viscosity and amount of liquid enclosed by the pod. The wave front shape is also influenced by the velocity at which the film unit is advanced through the pressure applying members, the amount of compressive pressure exerted on the film unit, and the resistance to fluid flow at the interfaces between the liquid and the predetermined layers.

One of the most commonly observed spread shapes is a tongue shape wherein the wave front progresses towards the trailing end more rapidly in the central portion of the photo-exposed or image-forming area than out at the lateral margins. This condition is most likely caused by the relatively low resistance to fluid flow at the center of the film unit compared to the flow resistance at the lateral margins or outer (off-center) portions of the image area. The difference in the flow resistance can be attributed to the fact that the lateral edges of the superposed sheet-like elements are held together by binding tape or structure within the camera while the central portion of the sheets are not so restrained and may more easily separate or delaminate to accommodate the mass of fluid discharged from the pod.

Due to the concentration of fluid at the center of the film unit, it is possible that the corners at the rear or trailing end of the image-forming area may not be completely covered during the subsequent spreading operation.

One method employed to compensate for the tongue-shaped wave front has been to equip the camera or film container with spread control devices which serve to modify the shape of the liquid wave front during spreading.

The spread control devices are designed to apply a second compressive force to the central portion of the film unit in the path of the mass of fluid discharged from the pod by the pressure-applying members. This serves to selectively reduce or limit the separation or gap between the adjacent layers and retard the central portion of the wave front thereby causing a flow of liquid in a direction transverse to the direction of film advancement. In this manner, the wave front is modified such that it is substantially straight and is oriented in a direction substantially normal to the parallel lateral sides of the rectangular or square image-forming area.

For examples of cameras and film cartridges which are equipped with devices for controlling the distribution of liquid processing composition, reference may be had to Kinsman, U.S. Pat. No. 3,832,731, entitled "Photographic Film Assemblage", and Friedman, U.S. Pat. No. 4,104,669, entitled "Photographic Processing Apparatus", both of which are assigned to the same assignee as the present invention and are incorporated herein by reference.

As disclosed in Bendoni, U.S. Pat. No. 4,087,831, entitled "Bearing Block Mount for a Photographic Fluid Spreading Apparatus" assigned to the same assignee as the present invention, it is well known in the art that the speed at which the film unit is progressively advanced between the rollers critically effects the distribution of the fluid processing composition between the superposed elements i.e., the thickness of the layer of the processing composition and thereby the final development of the photographic print. For example, if the film unit is advanced too rapidly between the rollers, the layer of processing composition deposited between the superposed elements may be too thin and result in a poor quality photographic print. Furthermore, if the film unit is advanced too slowly, the distribution of the processing composition between the superposed elements may be incomplete as the limited supply of fluid included in the container may be exhausted before the processing composition has been uniformly distributed in a layer between the superposed sheet elements. For instance, one of the major drawbacks in producing a self-developing camera of the type in which the film unit is manually withdrawn between the spreader elements is the inability to establish the highly unpredictable linear rate at which the film unit shall be withdrawn between the rollers by the operator. Typically, the desired linear rate or pull rate at which the film unit should be withdrawn between the rollers is within the range of 6 to 9 inches per second. However, it has been established that operators generally pull film units as rapidly as 105 inches per second and as slowly as 3 inches per second with a greater majority of the operators pulling the film unit at a rate exceeding 50 inches per second.

Similarly, if the camera is of the single lens reflex type, the complete operating cycle (which consists of converting the optical system from the viewing mode to an exposure mod) may occur in as little as 1.5 seconds, as discussed in Johnson, et al., U.S. Pat. No. 4,047,192, entitled "Photographic Apparatus with Sequencing System" assigned to the same assignee as the present invention.

It is stated in Takimoto, U.S. Pat. No. 5,032,911 entitled "Video Image Printer Using Liquid Crystal Light Valves and Primary Auxiliary Direction Scanning", that a printer is coupled to a video camera wherein the film is exposed successively line by line, and is introduced between the squeezing rollers in synchronism with exposure of the film. The Takimoto patent further states that the squeezing rollers serve as a means for spreading processing solutions, and pressing the film there between, while at the same time feeding the film in the auxiliary scanning direction. The Takimoto patent fails to disclose, among others, how the spread process is accomplished.

A primary concern of the present invention involves a processing fluid spread system that spreads the processing fluid on an advancing film unit without interfering with a stationary print head that is simultaneously exposing the advancing film unit by emitting consecutive lines of image bearing light on the film unit.

In particular, the print head is stationary while the film unit is advanced proximately thereto. Once the initial lines on the leading side of the film unit has been exposed then the fluid spread system begins to spread the processing fluid in a thin layer between the sheet elements, while simultaneously the trailing portion of the film unit continues to be exposed. In one embodiment of the present invention, the exposure time (i.e., the interval from the time the film unit is picked to completion of the film unit ejection) shall be less than 15 seconds which equates to approximately 0.37 inches per second. Since the advancing film unit is simultaneously exposed and photographically processed the fluid spreading rate is determined by the optimum exposure rate, i.e., 0.37 inches per second. This rate of processing the film unit is considerably slower than any of the other known prior art, or prior art discussed above. This specified unconventional slow rate of film exposure and advancement should be considered illustrative for the purpose of discussing the embodiments herein. Various ranges that may be approximate to this specified rate (either greater or lesser) should be included as well.

Another concern of the present invention is preventing the liquid wave front caused by the ruptured container from encroaching on the line of exposure emitted by the print head on the advancing film unit. Thus, the permitted wave front of the present invention is significantly less than the wave front of the prior art to prevent the processing fluid from covering areas of the film unit that have not yet been exposed.

There is therefore a need in the art for an effective photographic processing fluid spread system that can process an advancing film unit that is simultaneously and progressively being exposed by a print head. Particular need remains for a photographic processing fluid spread system that can control the thickness of the processing fluid layer in a uniform manner, as well as restrict the associated wave front of the processing fluid as the film unit is advanced at rate considerably slower than the conventional art.

SUMMARY OF THE INVENTION

The present invention is directed generally toward the field of photography and more specifically to a photographic processing fluid spread system, for use with integral type self-processible film unit, by which the thickness of a layer of processing fluid is controlled and restricted in a uniform manner as the processing fluid is spread across preselected portions of the film unit, while the film unit is also simultaneously being progressively exposed and advanced.

The present invention is directed generally towards an electronic printer for printing photographs having a processing fluid spread system disposed in the housing that is used for spreading the processing fluid of a self-processable film unit so that the film unit may be processed. The self-processable film unit is of the type including a pair of sheet elements and a rupturable container of the processing fluid positioned adjacent to a leading edge of the film unit. The electronic printer further includes a stationary print head suitable for emitting consecutive lines of image data on the film unit to expose the film unit while the film unit is advanced proximately to the print head. The electronic printer comprises a means for advancing the film unit along a predetermined advancement path whereby the film unit is simultaneously exposed by the print head and processed by the spread system. In particular, the spread system comprises a means for spreading the processing fluid in a thin layer between the sheet elements. Also, a pair of elongated juxtaposed pressure applying members which define an elongated spreader gap through which the film unit is advanced by the advancement means with the sheet elements in superposed relationship. The spread means applies a first constraint to the film unit to first rupture the container to release the processing fluid and then to cause the released mass of processing fluid to flow downstream between the sheet elements opposite to the direction of advancement of the film unit through the spreader gap. The processing fluid is progressively deposited between the sheet elements as a thin layer extending over a preselected area of the sheet elements which has been exposed by the print head. Also provided is a means for applying a second constraint to selective portions of the film unit to oppose the flow of the processing fluid, received downstream from the spreading means, relative to the sheet elements as the film unit is advanced through the spreader gap so as to cause the processing liquid to flow transversely to the direction of advancement of the film unit. Finally, a means is provided for applying a third constraint to selective portions of the film unit to oppose the flow of the processing fluid, received downstream from the second constraint means, so as to contain the wave front of the processing fluid within a predetermined longitudinal distance from the spreading means, thereby defining a wave extent, and to assist the transverse flow of the processing liquid by causing the processing liquid to coalesce or merge and flow transversely.

Another aspect of the present invention is directed towards a portable imaging system comprising an electronic camera device for capturing image data and an electronic printer device for printing photographs. Both of these devices are together disposed in the same housing of the size that is conveniently carried by hand. The printer device includes a processing fluid spread system for spreading the processing fluid of a self-processable film unit so that the film unit may be processed. The self-processable film unit is of the type including a pair of sheet elements and a rupturable container of the processing fluid positioned adjacent to a leading edge of the film unit. The printer device further includes a stationary print head suitable for emitting consecutive lines of image data on the film unit to expose the film unit while the film unit is advanced proximately to the print head. In particular, the imaging system further comprises an interface connecting means operating to effect an electrical connection between said camera device and printer device. It also includes a memory storage means for the imaging system for storing the image data, as well as a microprocessor unit disposed in the housing. The microprocessor being responsive to user selection for acquiring image data via the camera device. The microprocessor is operable to process said image data for memory storage and film unit exposure and processing. Also provided is a means for advancing the film unit along a predetermined advancement path whereby the film unit is simultaneously exposed by the print head and processed by the spread system.

In particular, the spread system of the portable imaging system comprises a means for spreading the processing fluid in a thin layer between the sheet elements, the fluid spreading means including a pair of elongated juxtaposed pressure applying members which define an elongated spreader gap through which the film unit is advanced by the advancement means with the sheet elements in superposed relationship. The spread means applies a first constraint to the film unit to first rupture the container to release the processing fluid and then to cause the released mass of processing fluid to flow downstream between the sheet elements opposite to the direction of advancement of the film unit through the spreader gap such that the processing fluid is progressively deposited between the sheet elements as a thin layer extending over a preselected area of the sheet elements which has been exposed by the print head. Also provided is a means for applying a second constraint to selective portions of the film unit to oppose the flow of the processing fluid, received downstream from the spreading means, relative to the sheet elements as the film unit is advanced through the spreader gap so as to cause the processing liquid to flow transversely to the direction of advancement of the film unit. A final means is provided for applying a third constraint to selective portions of the film unit to oppose the flow of the processing fluid, received downstream from the second constraint means, so as to contain the wave front of the processing fluid within a predetermined longitudinal distance from the spreading means, thereby defining a wave extent, and to assist the transverse flow of the processing liquid by causing the processing liquid to coalesce or merge and flow transversely.

Still yet, another aspect of the present invention is directed towards a method for printing photographs including the steps of spreading the processing fluid of a self-processable film unit using a spreading means so that the film unit may be processed; the self-processable film unit is of the type including a pair of sheet elements and a rupturable container of the processing fluid positioned adjacent to a leading edge of the film unit. A second step includes emitting consecutive lines of image data on the film unit using a printing means to expose the film unit while the film unit is advanced proximately to the print head, wherein the print head is stationary. A third step involves advancing the film unit by an advancing means along a predetermined advancement path whereby the film unit is simultaneously exposed by the print head and processed by the spread system. In particular, the spreading comprises spreading the processing fluid in a thin layer between the sheet elements using the spreading means. The spreading means includes a pair of elongated juxtaposed pressure applying members which define an elongated spreader gap through which the film unit is advanced by the advancement means with the sheet elements in superposed relationship to apply a first constraint to the film unit to first rupture the container to release the processing fluid and then to cause the released mass of processing fluid to flow downstream between the sheet elements opposite to the direction of advancement of the film unit through the spreader gap such that the processing fluid is progressively deposited between the sheet elements as a thin layer extending over a preselected area of the sheet elements which has been exposed by the print head. It further includes, applying a second constraint to selective portions of the film unit to oppose the flow of the processing fluid, received downstream from the spreading means, relative to the sheet elements as the film unit is advanced through the spreader gap so as to cause the processing liquid to flow transversely to the direction of advancement of the film unit. Finally, the spreading includes applying a third constraint to selective portions of the film unit to oppose the flow of the processing fluid, received downstream from the second constraint means, so as to contain the wave front of the processing fluid within a predetermined longitudinal distance from the spreading means, thereby defining a wave extent, and to assist the transverse flow of the processing liquid by causing the processing liquid to coalesce or merge and flow transversely.

An advantage of the present invention is that it provides a processing fluid spread system that spreads the processing fluid on an advancing film unit without interfering with the progressive exposure of the film unit by a stationary print head that is simultaneously exposing the advancing film unit by emitting consecutive lines of image bearing light onto the film unit.

Another advantage of the present invention is that the fluid spread system is able to prevent the liquid wave front, that is caused by the ruptured container from encroaching on the line of exposure emitted by the print head on the advancing film unit. Thus, the permitted shape and extent (downstream) of the wave front of the present invention is significantly less than the wave front of the prior art.

Still yet, another advantage of the present invention fluid spread system is that it can process an advancing film unit that is simultaneously being progressively exposed by a print head. In particular, it can control the thickness of the processing fluid layer in a uniform manner, as well as restrict the associated wave front of the processing fluid as the film unit is advanced at rate considerably slower than the conventional art, for example one tenth of the conventional rate.

Further yet, an advantage of the present invention is that it can operate with the print head, effecting an exposure line-to-line spacing of at least 5 µm center-to-center, on the film unit.

Moreover, an advantage of the present invention is that it is efficient in size and power requirements since the processing and exposing is simultaneously combined during operation. As a result, the system is also cost effective to manufacture. Finally, the system is readily portable for the user to carry.

These and other objects, along with advantages and features of the invention disclosed herein, will be made more apparent from the description, drawings and claims that follow.

BRIEF DESCRIPTION OF THE DRAWINGS

The foregoing and other objects, features and advantages of the present invention, as well as the invention itself, will be more fully understood from the following description of preferred embodiments, when read together with the accompanying drawings, in which:

FIG. 9 is a plan view of the film unit drive and processing fluid and spread system sub-assemblies (viewing it from the front side of the housing), with a film unit advanced there between.

FIG. 10 is a plan view of the film unit drive and processing fluid spread system sub-assemblies 400 (opposite view of that of FIG. 9 and viewing from the bottom side of housing) with a film unit advanced there between.

FIG. 26 (A) and (B) are plan views of a film unit showing the progressive advancement of a liquid wave front, in dotted lines, to illustrate the distribution of the processing fluid when the second and third constraint members are not utilized in the spread system.

DETAILED DESCRIPTION OF THE PREFERRED EMBODIMENTS

Figure 1:
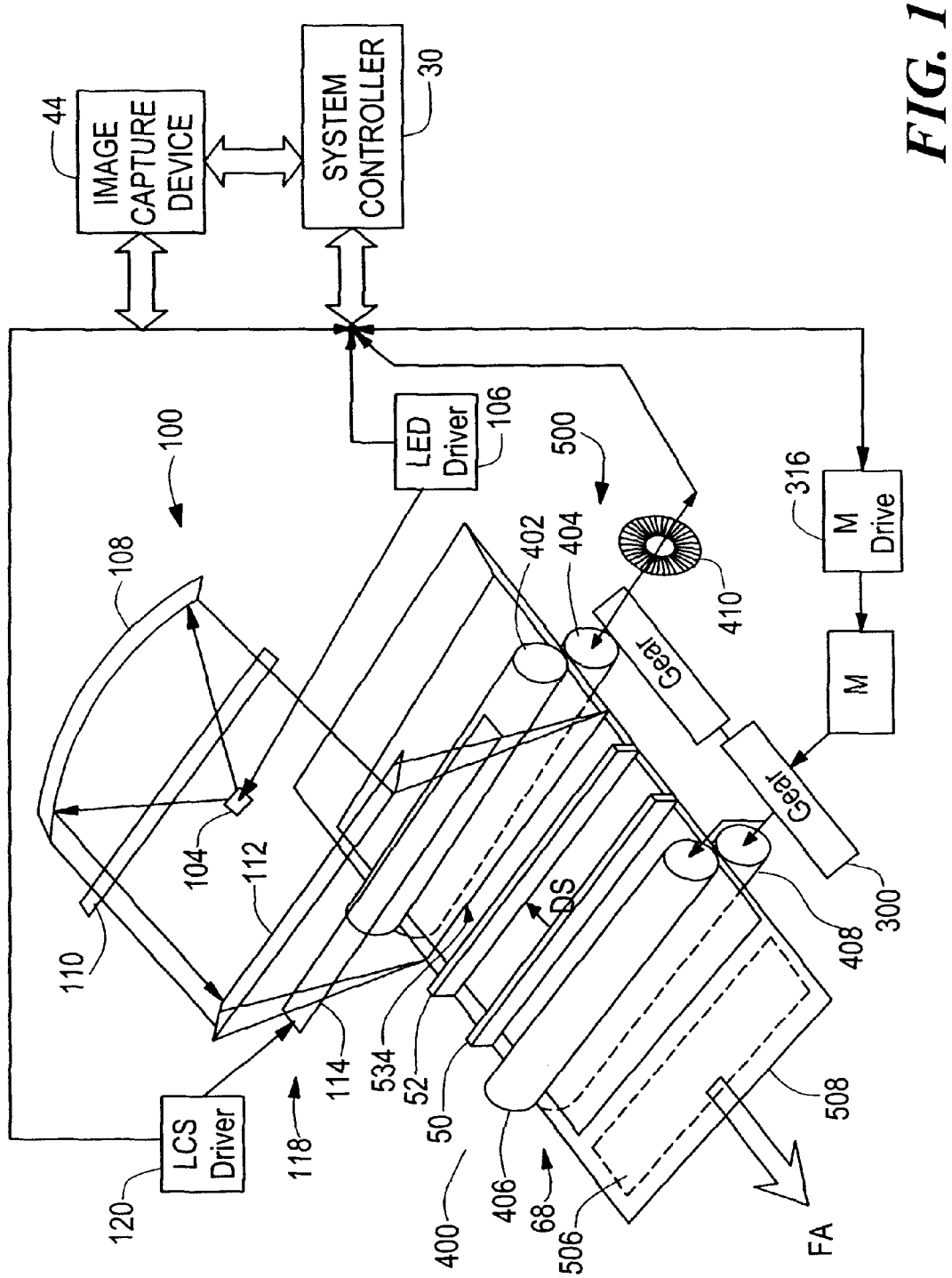
FIG. 1 is a high level schematic diagram of the film unit drive and processing fluid spread system sub-assemblies and the optical assembly.
Figure 2:
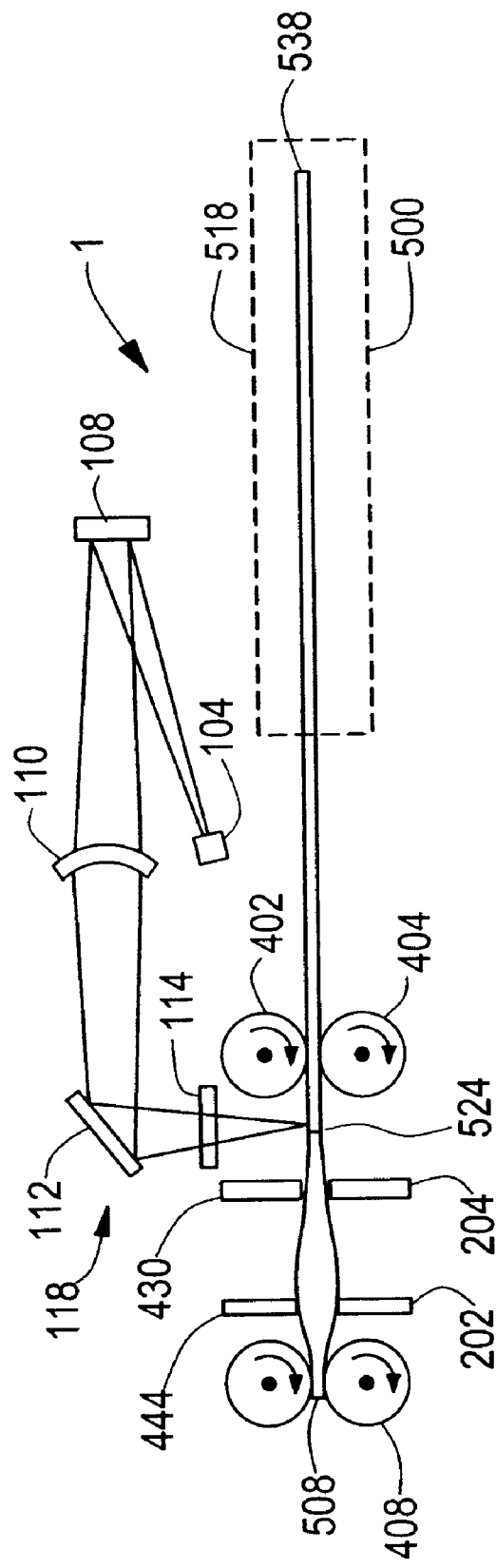
FIG. 2 is a high level sectional view of the film unit drive and processing fluid spread system sub-assemblies and the optical assembly relative to a film unit.

FIGS. 1–3 provide a high level schematic overview of the related electronic printer system. As shown in FIG. 1, the optical assembly 100 has a light source such as LEDs 104 for emitting colored light (R, G, & B) toward a cylindrical mirror 108 which is then reflected in a substantially collimated beam (in one direction) toward a cylindrical lens 110. The cylindrical lens 110 causes the substantially collimated beam of light to coverage along one axis where it is then reflected off a flat mirror 112 and passes through a spatial light modulator such as a liquid crystal shutter (LCS) 114. The spatial light modulator LCS 114 in combination with the flat mirror 112, lens 110, cylindrical mirror 108, and light source 104 serves, generally, as a stationary print head 118 that emits consecutive lines of image data on a self-developing film unit 500 as the film unit 500 is advanced in the direction indicated by arrow FA. The consecutive lines of image data effects lines of exposure 534 on the film unit 500. In essence, the LEDs 104 are activated by the LED driver 106 to provide the light source in cooperation with the LCS 114 that is modulated by an LCS driver 120 according to the data obtained by an image capture device 44, such as an electronic camera.

The cylindrical lens 110 has an integral refractive aperture as disclosed in U.S. provisional application Ser. No. 60/179,224 entitled "Lens with Integral Refractive Aperture". Alternatively, an aperture stop in optical alignment with the cylindrical lens 110 (without the integral aperture) could be provided, as disclosed in U.S. Pat. No. 6,014,202, entitled "Optical System for Transmitting a Graphical Image."

Figure 9:
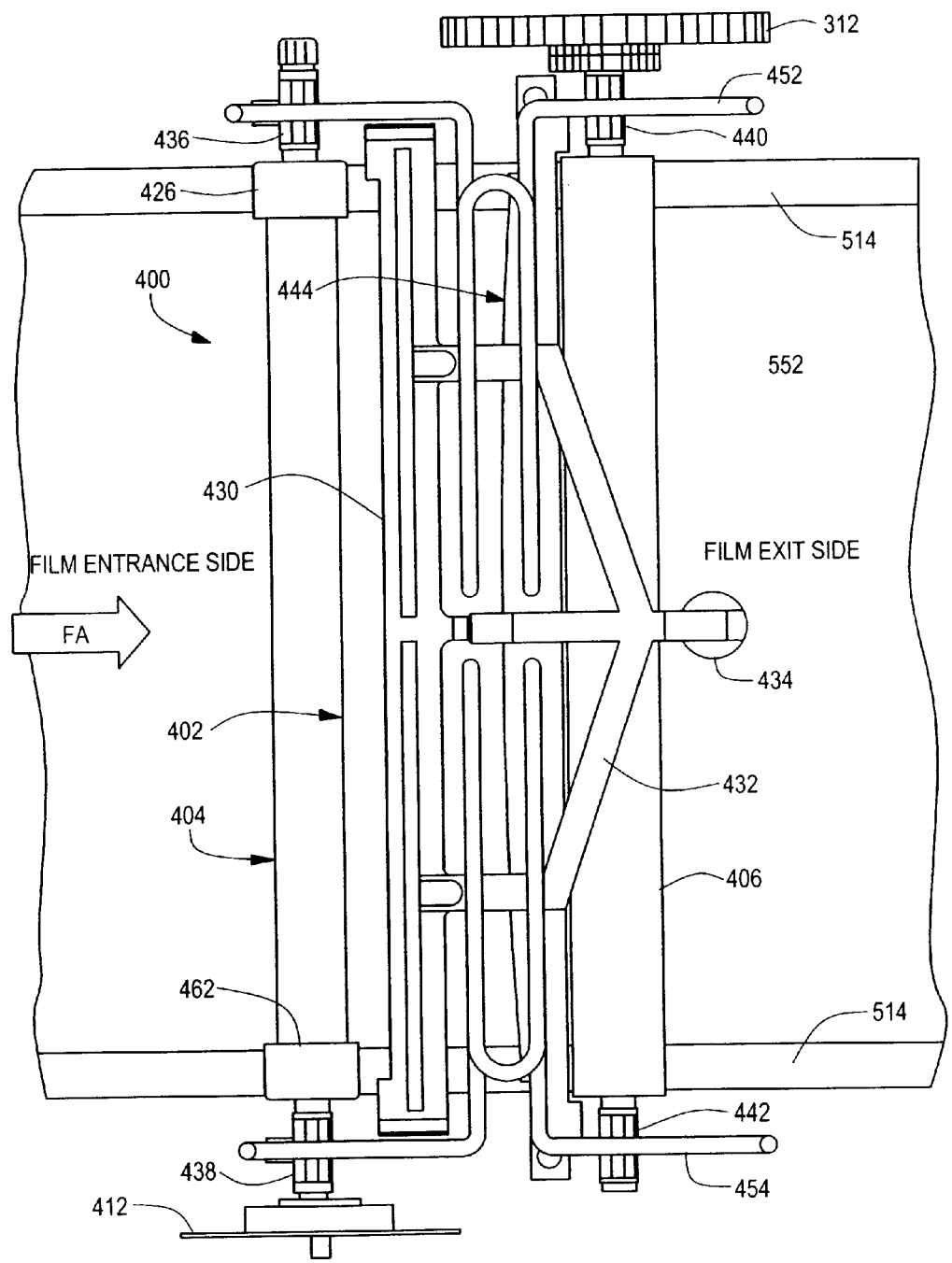

With regard to the mechanism for advancing the film unit 500, a film unit drive and processing fluid spread system sub-assembles 400 are provided. It should be noted that the driven transfer roller 402, follower transfer roller 404, upper spread roller 406, lower spread roller 408, upper clamp 430, clamp arms 432, upper bow 444, transfer roller spacer pads 436, 438, spread roller spacer pads 440, 442, and torsion springs 452, 454 (as shown in FIG. 9), collectively comprise the film unit drive and processing fluid spread system sub-assemblies 400.

Figure 12:
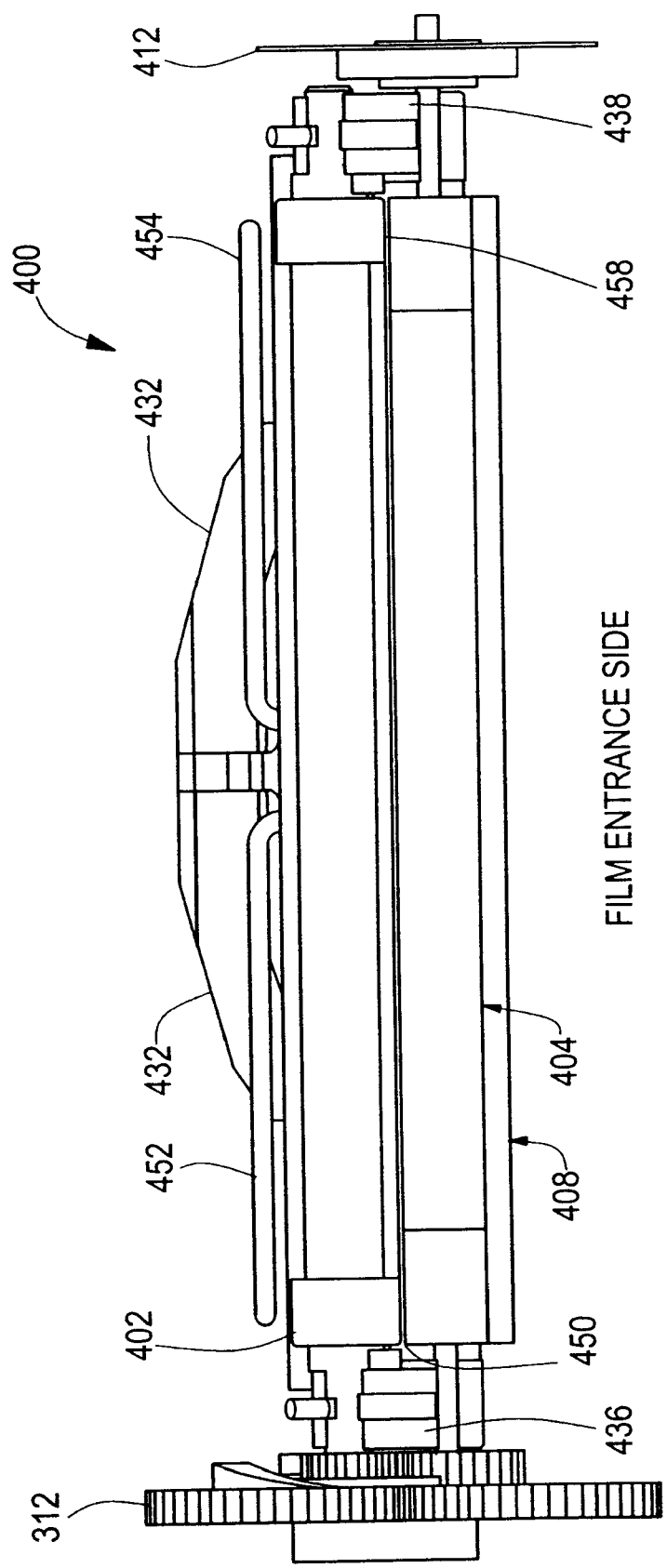
FIG. 12 is an opposite view of FIG. 11 showing an elevation view of the film unit drive and processing fluid spread system sub-assemblies as viewed from the film entrance side of the sub-assemblies.

The pair of transfer rollers comprising a driven transfer roller 402 and a follower transfer roller 404 provide a transfer nip 450 (as shown in FIG. 12) for advancing the film unit 500 along a transfer path between the transfer rollers as indicated by the arrow FA.

Figure 11:
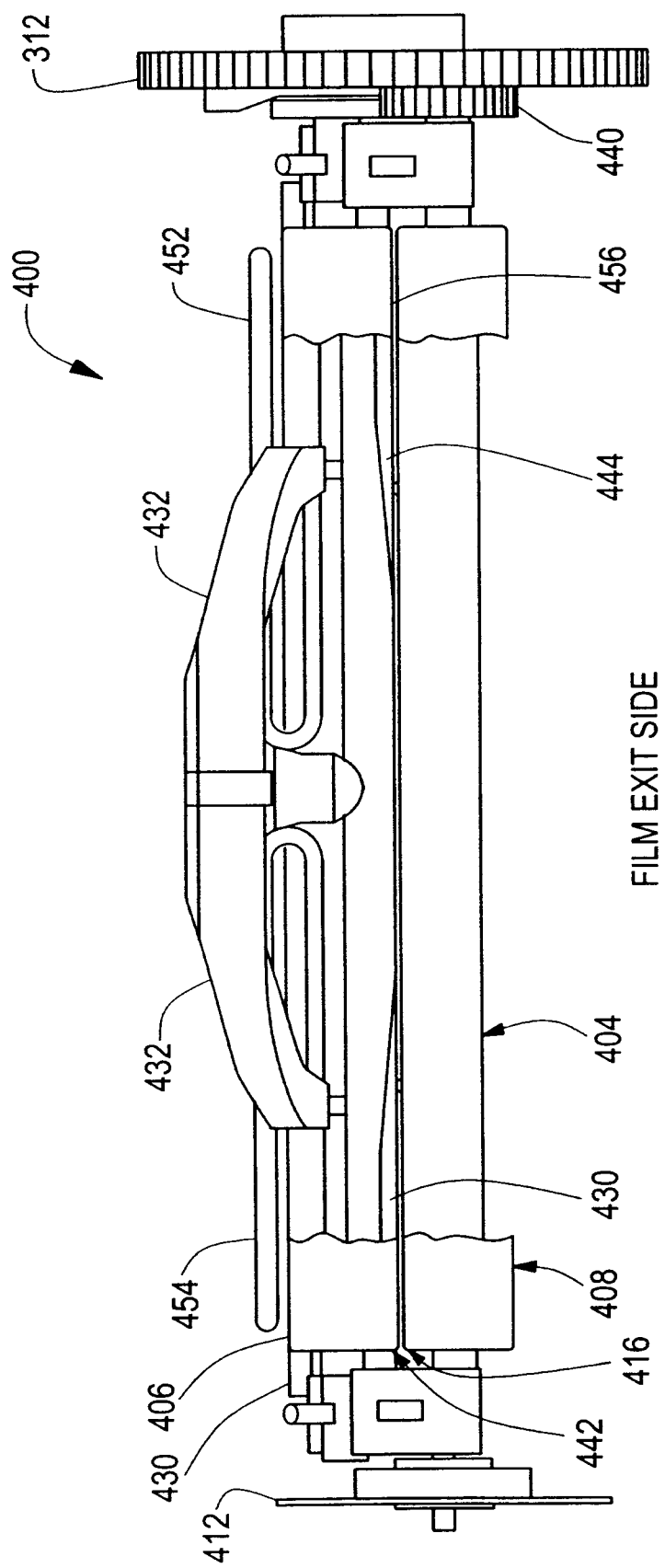
FIG. 11 is an elevation view of the film unit drive and processing fluid spread system sub-assemblies as would be viewed from the top wall of the housing, with the spread rollers partly shown in a cut away section.

The pair of spread rollers comprising the upper spread roller 406 and the lower spread roller 408 that provide a spread nip 416 (as shown in FIG. 11) for receiving the leading edge of the film unit 500 received from the transfer rollers 402, 404. The spread rollers 406, 408 continue feeding the film unit 500 between the pair of spread rollers to continue the advancement of the film unit 500 in the film unit advancement direction as indicated by the arrow FA. A motor 302, driven by a motor driver 316, drives a gear train assembly 300 that drives the upper and lower spread rollers 406, 408. In addition, the gear train assembly 300 also drives the driven transfer roller 402. A film follower encoder 410 is in communication with the follower transfer roller 404 to measure the circumferential movement of the follower transfer roller 404, as determined by the speed of the film unit 500 being advanced between the transfer rollers. As such, this circumferential movement of the follower transfer roller 404 corresponds with the advancement of the film unit 500 which then allows the film follower encoder 410 to relay to a system controller 30 the relative position of the film unit 500 in respect to the stationary print head 118.

In addition, while the print head 118 is emitting consecutive lines of image data to expose the advancing film unit 500, a processing fluid spread system 400 is spreading the processing fluid of the film unit 500 contained in the rupturable container 506 near the leading edge of the film unit 508. The upper and lower spread rollers 406, 408, serving as first constraint member 68, apply a first constraint to the film unit 500 to first break the rupturable container 506 so as to release the processing fluid and then to cause the released mass of processing fluid to flow downstream (as indicated by the arrow DS) between the sheet elements 502, 504 opposite to the direction of the advancement of the film unit (as indicated by the arrow FA). As the film unit 500 is advanced through the upper and lower spread rollers 406, 408 the processing fluid is progressively deposited between the sheet elements 502, 504, as a thin layer extending over a pre-selected area of the sheet elements which has already been exposed by the stationary print head 118.

A second constraint member 50, that includes the upper bow 444 and a lower bow member 202 (to be discussed later), is provided to apply a second constraint to selected portions of the film unit 500 so as to oppose the flow of processing fluid, received downstream from the upper and lower spread roller 406, 408 as the film unit 500 is advanced through the spread rollers 406, 408 so as to cause the processing liquid to flow transversely to the direction of the advancement of the film unit i.e., towards the lateral margins 514 of the film unit 500.

In addition, a third constraint member 52, that includes the upper clamp 430 and a lower clamp member 204 (to be discussed later), is provided to apply a third constraint to selected portions of film unit 500 so as to oppose the flow of processing fluid received downstream (as indicated by the arrow DS) from the second constraint 50 so as to contain the wave extent or the maximum wave front of the processing fluid within the predetermined longitudinal distance from the upper and lower spread roller 406, 408, whereby this predetermined longitudinal distance defines a wave limit 558. Besides containing the wave front within the wave limit 558, the third constraint member 52 also assists the second constraint member 50 to cause the processing liquid to flow transversely, thus causing the processing liquid to coalesce or merge in a pool. It is critical that the processing fluid is contained within the wave limit 558 so that the processing fluid does not encroach upon the exposure line 534 being emitted by the stationary print head 118 on the advancing film unit 500.

FIG. 2 illustrates the schematic view of the electronic printer system 1 in operation. As illustrated in FIG. 2, a film unit 500 is being advanced by the driven transfer roller 402 and the spread rollers 406, 408, whereby the leading edge 508 of the film unit 500 is engaged in the spread nip 416 of the spread rollers 406, 408 and the leading edge 524 of the image forming area is being exposed by the image data emitted from the stationary print head 118.

Figure 3A:
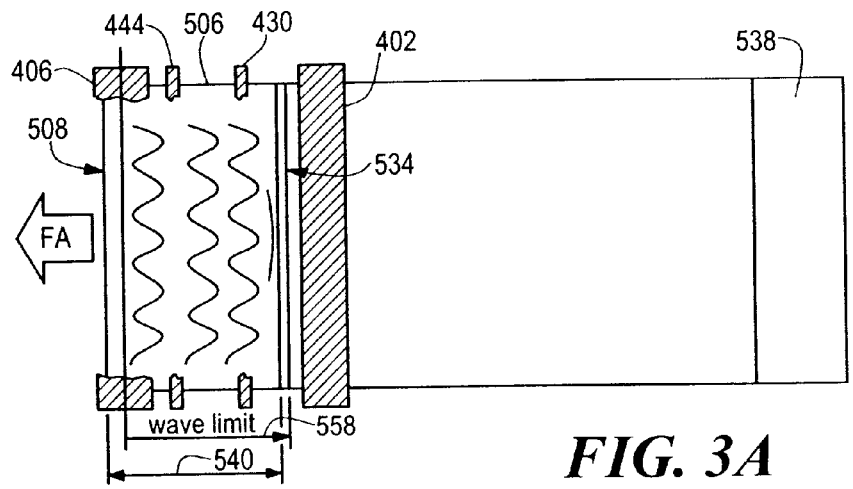
FIGS. 3(A)–(C) are plan views of FIG. 2, showing the progressive advancement of the film unit in relation to the progressive exposure and fluid spreading.

Turning to FIG. 3(A), FIG. 3(A) is a plan view of FIG. 2 showing a film unit 500 being advanced in the direction as indicated by the arrow FA. The wave limit 558 is illustrated as the maximum distance from the center line of the spread rollers 406, 408 by which the processing fluid can extend without encroaching on the exposure line 534. As can be noted, the leading longitudinal margin 516 has a dimensional length, as indicated by reference no. 540, that is slightly longer than the length of the wave limit 558. To aid in the effort of providing a smooth film unit advancement, the leading edge. 508 should be engaged with the spread rollers 406, 408 before the print head 118 exposes the initial line(s).

Once the leading edge 508 of the film unit 500 is engaged with the spread rollers 406, 408, the spread rollers 406, 408 in conjunction with the driven transfer roller 408 are able to advance the film unit 500 in a relatively continuous smooth and constant motion. Also once the leading edge 508 of the film unit 500 is engaged with the spread nip 416 of the spread rollers 406, 408 then the print head 118 is activated, whereby LEDs 104 are turned on in sequence and the LCS shutter 114 is modulated to create the proper exposure onto the advancing film unit 500.

Figure 3B:
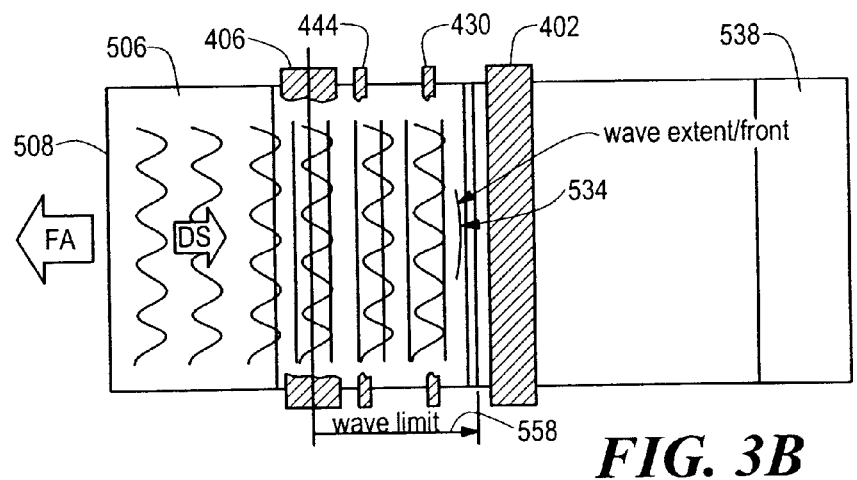

Turning to FIG. 3(B), FIG. 3(B) shows the similar plan view as in FIG. 3(A) except that the film unit has been progressively advanced wherein the print head 118 has exposed approximately half of the image forming area 522 (as depicted by the straight-uniform lines) and the spread system has processed nearly the same area (as depicted by the wavy lines) while still staying within the wave limit 558. One can observe from FIG. 3(B) that the wave limit 558 is a fixed length from the center line of the spread rollers 406, 408 and that the processing fluid wave front must always be contained within, in part by the help of the upper clamp 430 (i.e., third constraint member 52) so as to not encroach on the image line 534.

Figure 3C:
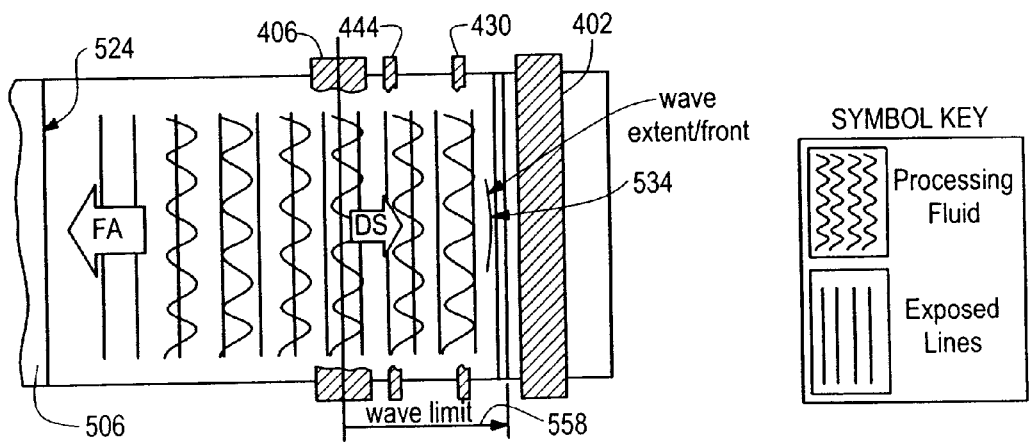

FIG. 3(C) shows the film unit 500 that has been almost completely advanced and which has been almost entirely exposed and processed.

Figure 4:
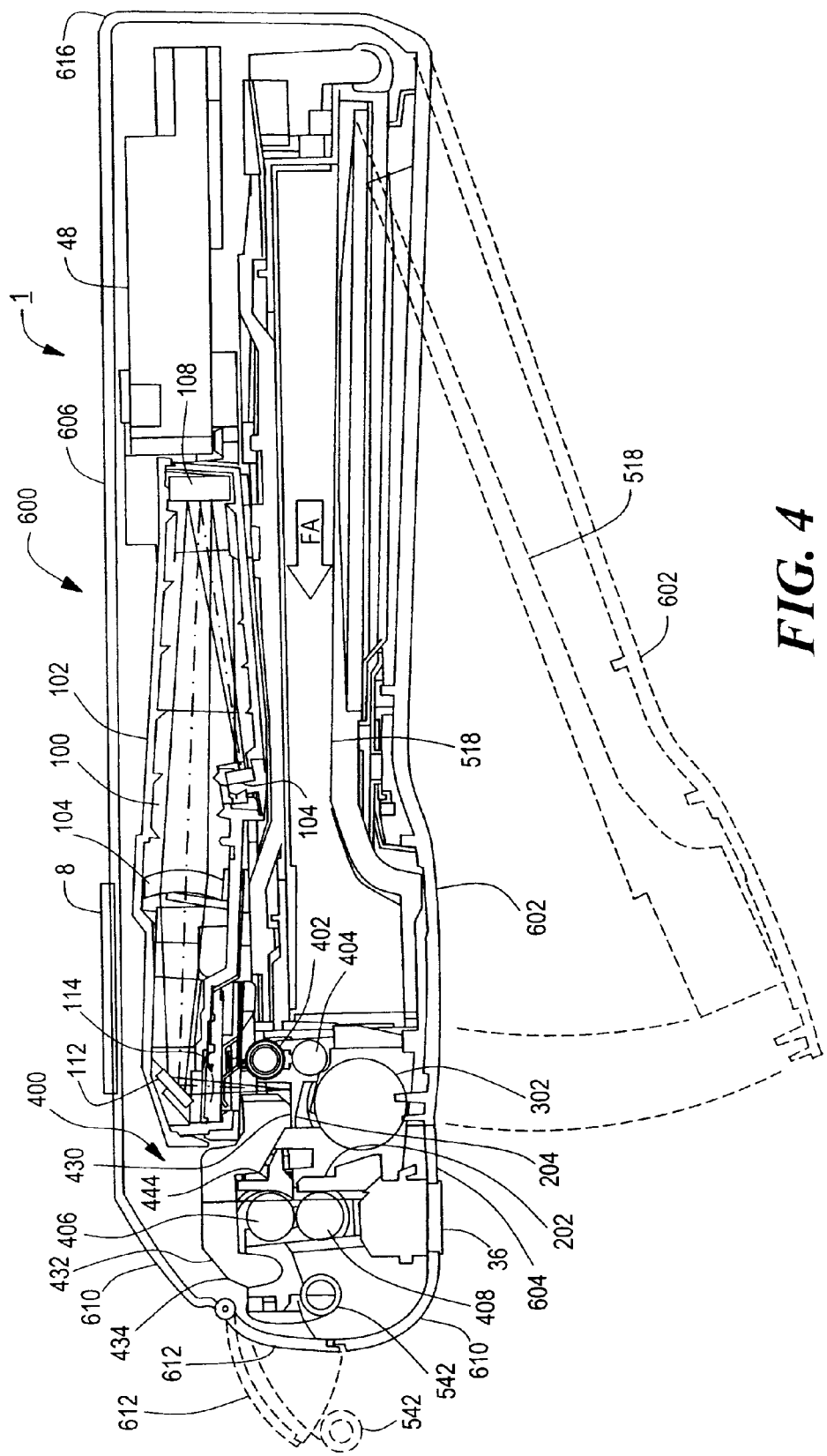
FIG. 4 is a sectional view of the electronic printing system and exterior housing, with film door in an open and closed position.

Referring to FIG. 4, FIG. 4 illustrates a cross sectional view of the electronic printing system 1 comprising a film cassette 518 for holding a stack of film units 500 whereby the film units are advanced into the film unit drive and processing fluid spread system sub-assemblies 400 while being exposed by the optical assembly 100, wherein the film units 500 are then exited through the exit door 612 of the housing 600 and beyond the film shade 542.

The housing 600 generally has a back wall 606, front wall 604, bottom wall 616 and top wall 610 (having an arch-like shape). On the front wall 604 is a film door 602 which makes up in part the front wall 604 when in the closed position. When the film door 602 is in the open position, as designated by the dotted lines, the film cassette 518 can be manually loaded. Also shown is the film exit door 612, which makes up in part the top wall 610, shown in the closed position and the open position, as designated by the dotted lines. Similarly, a film shade 542 is depicted in the closed position and in the partially extended position, also designated by the dotted lines. As will be discussed in greater detail below, film units 500 will be advanced from the film cassette 518 towards the film entrance side of the film unit drive and processing fluid spread system sub-assemblies 400, in the direction indicated by the arrow FA. While the film unit 500 is advanced through the sub-assemblies 400, the film unit will be simultaneously exposed and processed where it will then be exited through the film exit side of the sub-assemblies 400 out past the film exit door 612.

Figure 5:
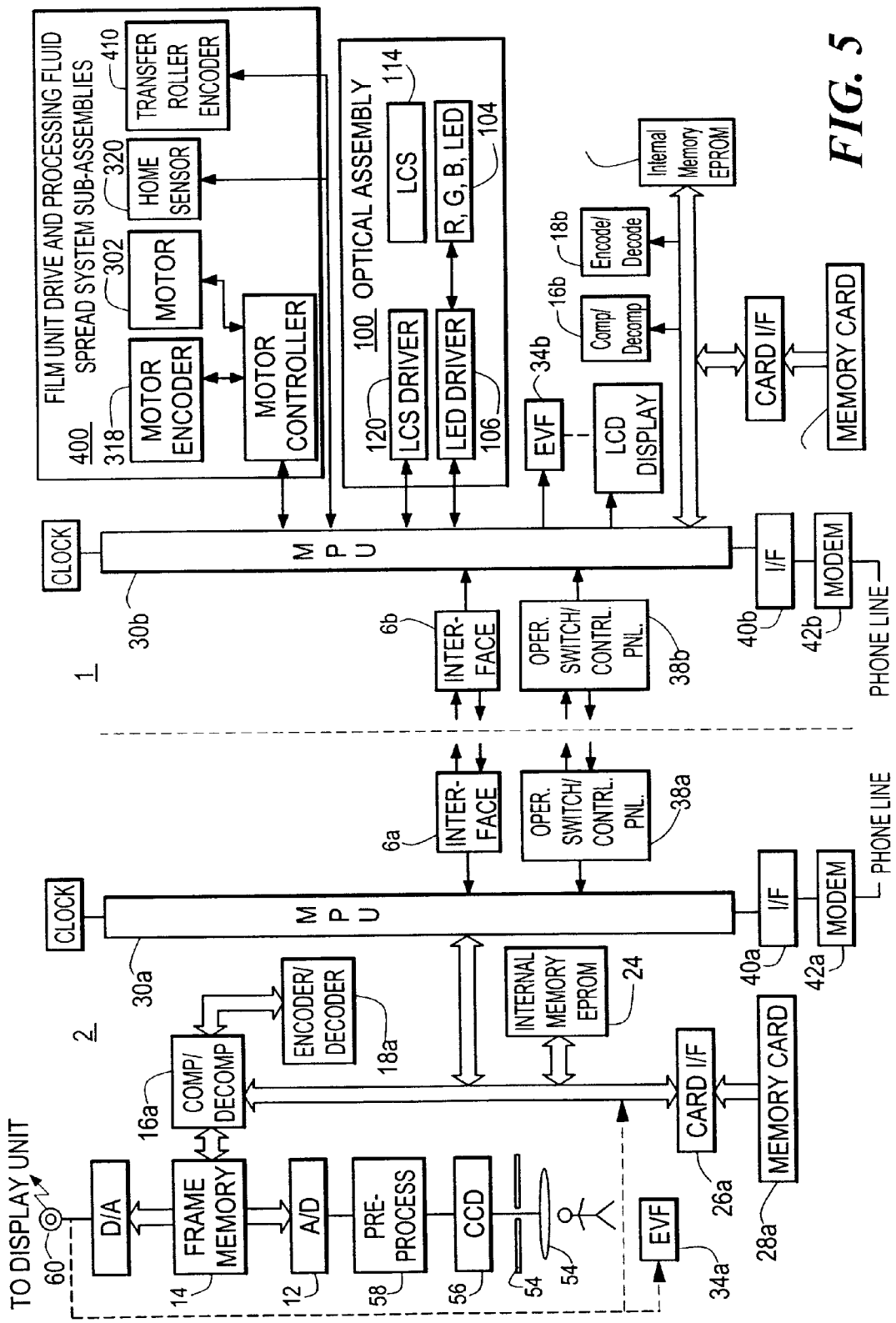
FIG. 5 is a circuit block diagram showing an electronic printing system in communication with the image capturing system.

FIG. 5 is a circuit block diagram showing an electronic printing system 1, in communication with the image capturing system 2, e.g. electronic camera. The image capturing system 2 is intended to be illustrative and not restrictive. With regards to the image capturing system 2 of the present invention the following reference of an electronic camera may be had to Finelli et. al., U.S. Pat. No. 4,937,676, entitled "Electronic Camera System With Detachable Printer", which is assigned to the same assignee as the present invention and is incorporated herein by reference. In addition, references may be had to Saito, U.S. Pat. No. 5,724,155, entitled "Electronic Imaging System" and Moronaga, U.S. Pat. No. 5,473,370, entitled "Electronic Still Video-Camera and Playback Apparatus thereof being Capable of Storing Image Data when the Storage Capacity of a Memory Card is Exceeded", both of which are incorporated herein by reference.

Referring to FIG. 5, the operation of the individual system components is controlled by a microprocessor unit (MPU) 30. When the image capturing system or electronic camera 2 is in the recording mode, the image of a subject is formed on a solid state electronic image pick-up element such as a CCD 56 through an image optical system comprising an object lens 36 and a shutter 54, for controlling transmission of the incoming light. The electronic image picked up by the CCD 56 is converted into electric signals at the moment a shutter release button (not shown) is pressed. Thereafter, the electric signal is outputted by the CCD 56 as image data representing the image of the subject captured. The output of the CCD 56 is subjected to pre-processing such as amplification and white balance adjustment and a pre-processing circuit 58. The resulting pre-processed digital image data is then converted by the A/D converter circuit 12, and the digital image data is stored temporarily in the frame memory 14 via the MPU 30. The digital image data read out from the frame memory 14 is converted again by D/A converter 20 into analog signals to be sent as video signals through a video encoder (not shown) in the form of a video output terminal 60. The video signal is displayed as the viewfinder image in the electronic viewfinder (EVF) 34, which also operates as the LCD Display 8. One skilled in the art would appreciate that an optical viewfinder could also be used instead of the EVF 34.

In addition, the image data is read out of the frame memory 14 and can be applied to a compression/decompression circuit 16, such as DCT or inverse DCT (IDCT). The compression circuit 16 compresses the image data by the compression algorithms and expands image data by decompression algorithms. As a result of being in the compressed data format, the amount of data in one frame of image data is reduced, and therefore the number of frames capable of being recorded in an external memory card 28 or an internal memory 24 of the system is increased.

The compressed image data can be read out of the frame memory 14 and applied to the coding/decoding circuit 18. While the compressed image data is being coded by the coding/decoding circuit 18, it is directed through a card interface (card I/F) 26 and stored in the external memory card 28 or the internal memory 24 depending upon the selection made by the operator via the operation switches/control panels 38. The operation switches/control panels is controlled by the MPU 30.

In the playback mode, an image frame is read out of external memory 28 or internal memory 24 from the compressed image data stored on these memories. After being subjected to playback processing, the read image data is either displayed in a viewfinder (constituted by a LCD display 8, for example) or applied to an external display unit via the video output terminal 60 or the serial port terminal used for connecting to an external display unit.

The MPU 30 executes control of the memories for compressing and expanding the image data in the manner described above; changeover control of the operator switches/control panels 38: control for changeover between the recording and the play back modes; control for accessing the internal memory 24 and the external memory 28 and designating frame numbers; and control of display menu and controls displayed on the LCD panel or 8/EVF 34.

Also controlled by the MPU 30 is the film unit drive and processing fluid spread system assemblies 400 and the optical assembly 100.

Also, communication with the electronic printing system 1 may be accomplished via the interface I/F 40 and a modem 42 connected to the phone line so that the image data may be transmitted by downloading and uploading over the I/F 40.

As one skilled in the art would appreciate, the operating switches/control panels 38 entail functions in the image capturing mode such as shutter release, exposure settings, quality settings, and other related image capturing options. With regards to the functions related to the image play-back mode, the playback mode functions, as determined by the operation switches/control panels 38, entail selecting pictures for prints, magnifying pictures, protecting and deleting pictures, and reviewing and printing the photographic pictures. The LCD display 8 may be used for an electronic viewfinder EVF 34 and for reviewing the captured images and displaying the menu options of the various functions.

Figure 6:
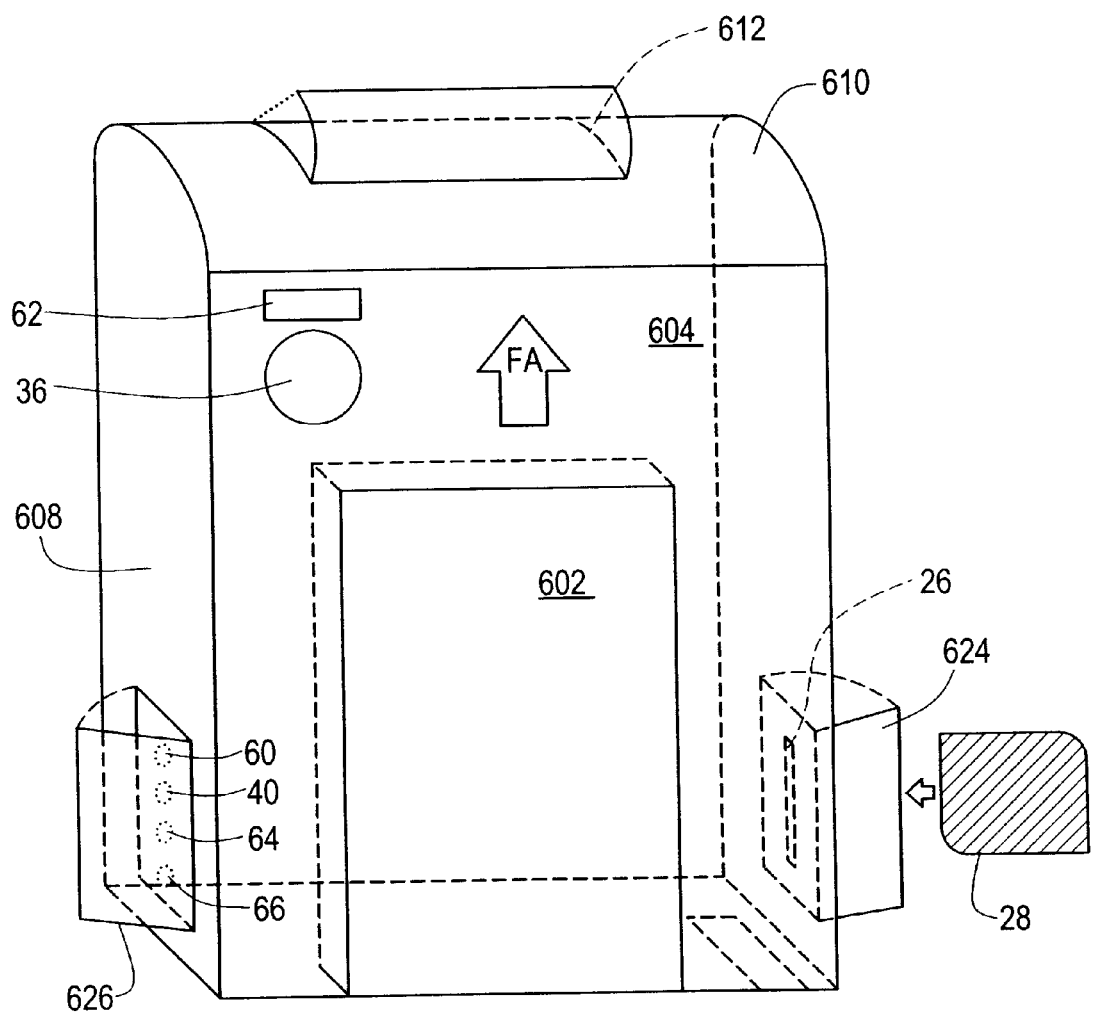
FIG. 6, illustrates a front side perspective view of the present invention electronic printer and camera housing.
Figure 7:
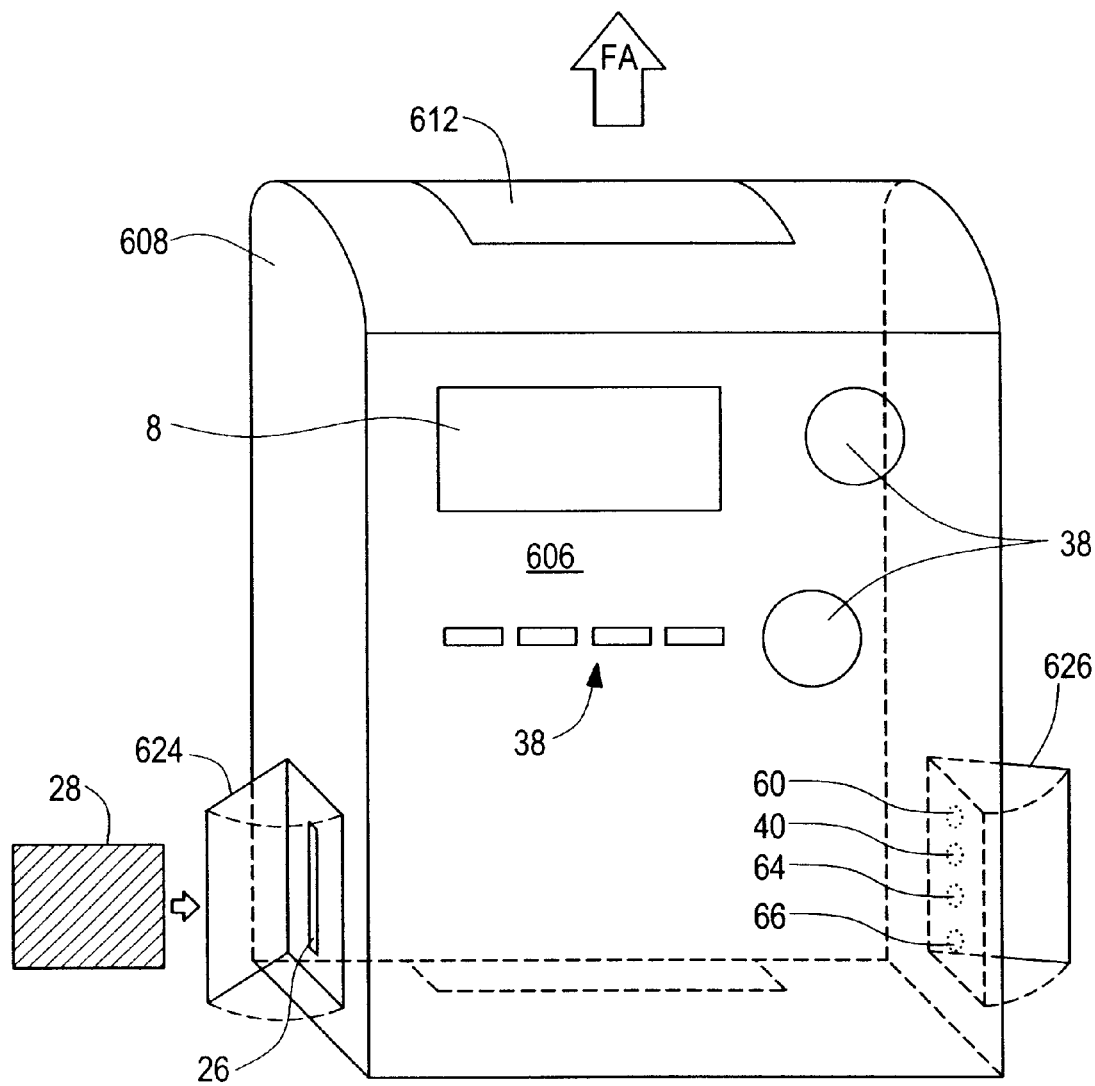
FIG. 7 illustrates a back side perspective view of the present invention electronic printer and camera housing.

FIGS. 6 and 7 illustrate the housing 600 for which the electronic printing system 1 and the image capturing system 2 is housed therein. Turning to FIG. 6, there illustrated is the front wall 604 having a top wall 610, with an arched-like shape, with the exit door 612 disposed thereon (dotted lines on the exit door 612 indicating the open position) wherein the film unit 500 exits out of the film exit door 612 in the direction as indicated by arrow FA. Also disposed on the front wall 604 is the film door 602 mounted thereon (and is included as part of the front wall 604) where the film cassette 518 can be manually loaded by opening the film door 602. The electronic flash 62 and the object lens or zoom lens 36 is also disposed on the front wall 604. The housing 600 has two respective side walls marked as 608 wherein on one of the side walls there is disposed a connection port door 626 having four port connections which include the video output terminal 60, the interface (I/F) terminal 40, the serial port connector 64, and finally the power port connector 66. On the opposite respective side wall 608 there is disposed the memory card door 624 wherein the card interface (card I/F) 26 is disposed, whereby the external memory card 28 is received.

Referring to FIG. 7, there is illustrated a back wall 606 of the housing 600 having a LCD display 8 as well the operation switches/control panels, generally indicated as reference no. 38, wherein these switches and controls are generally known to those skilled in the art and have been briefly discussed above. This view also shows the memory card door 624 and the connection port door 626 mounted on the respective side walls 608, as well as the film exit door 612 mounted on the top wall 610 (direction of the film advancement is generally indicated by the arrow FA).

Figure 8:
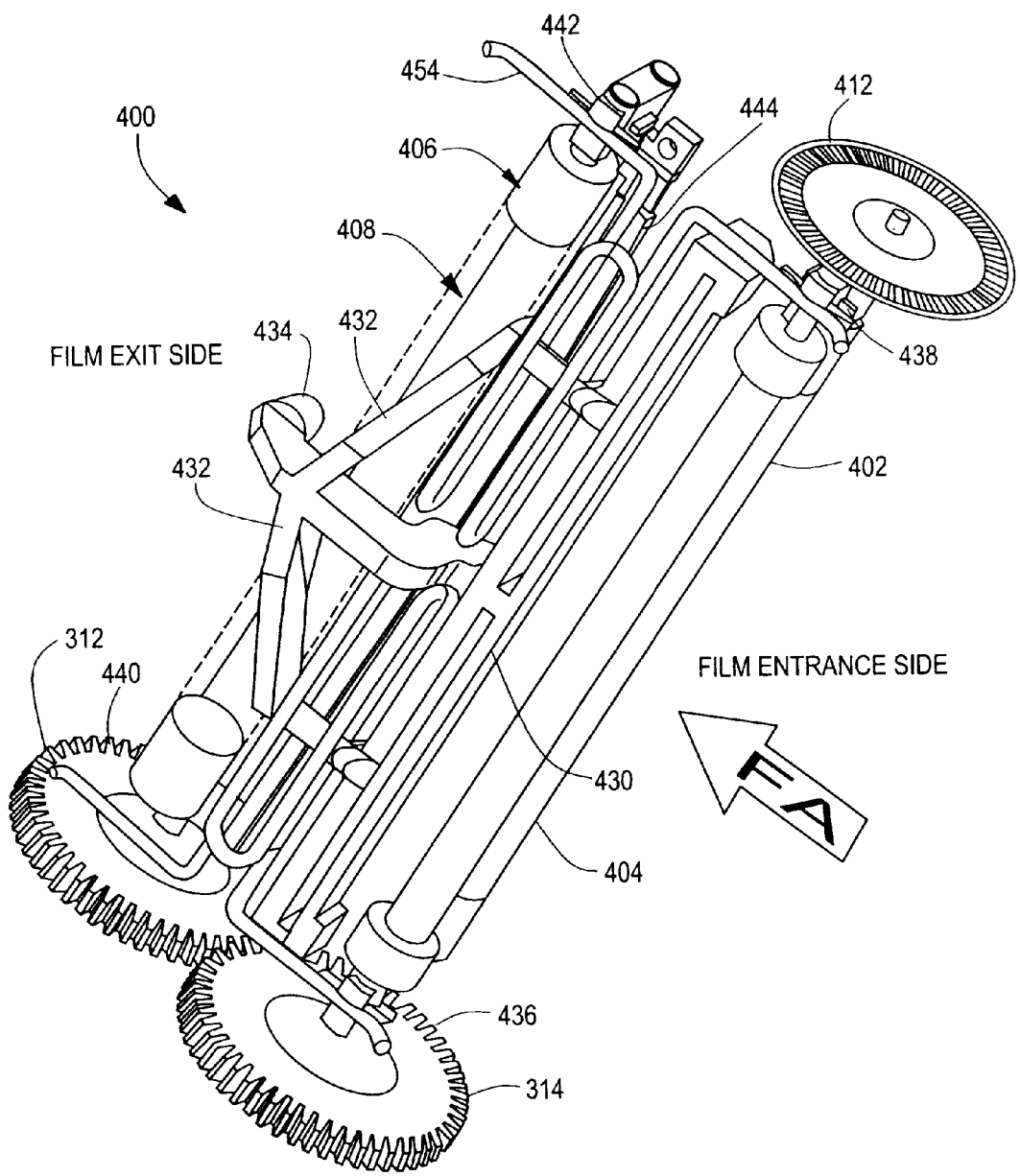
FIG. 8 is a perspective view of the film unit drive and processing fluid spread system sub-assemblies.

FIG. 8 illustrates a perspective view of the film unit drive and processing fluid spread system sub-assemblies 400 for which the film units, advancing in the film advancement direction as designated by arrow FA, enter the film entrance side of the sub-assemblies 400 and exits opposite at the film exit side. The film unit drive and processing fluid spread system sub-assemblies 400 include the driven transfer roller 402 in a juxtaposed relationship with the follower transfer roller 404. On the axis of the follower transfer roller 404 is the encoder wheel 412 and on the axis of the driven transfer roller 402 is the transfer roller gear 314. Also shown is the upper spread roller 406, in a partial cut away view, and the lower spread roller 408 in a juxtaposed relationship with the upper spread roller 406. Located on the axis of the lower spread roller 408 is the spread roller gear 312. Also shown is the upper clamp 430 having upper clamp arms 432 connecting to a clamp mount 434 which would be pivotally mounted to the main frame 200 (not shown). An upper bow member 444 is also shown. Also shown is a spring system 446 that includes a first torsional spring 452 and a second torsional spring 454 adapted for applying pressure on the upper spread roller 406(at the vicinity of the spread roller spacer pads 440, 442), the upper clamp 430 (at the vicinity of the two outer arms 432) and the driven transfer roller 402 (at the vicinity of the transfer roller spacer pads 436, 438).

FIG. 9 illustrates a plan view of the film unit drive and processing fluid and spread system sub-assemblies 400 (i.e., viewing it from the front side of the housing 600), wherein the film unit 500 would be advanced in the direction indicated by the arrow FA starting from the film entrance side of the sub-assemblies 400 and exiting out of the sub-assemblies 400 at the film exit side. It can be noted, that the torsional springs 452, 454 exert pressure on the upper spread roller 406 at the spread roller spacer pads 440, 442, respectively. Also, the torsional springs 452, 454 exert pressure on the upper clamp 430 through the two outer arms 432 of the upper clamp 430. Finally the torsional springs 452, 454 also apply forces on the driven transfer roller 402 at the transfer rollers spacer pads 436, 438, respectively.

Still referring to FIG. 9, the driven transfer roller 402 has transfer roller collars 462, 464 at its respective ends. These collars 462, 464 form a stepped region or raised shoulder that strategically coincide with the leteral margins 514 of the advancing film unit 500. The collars 462, 464 will contact the lateral margins 514 to preclude the remainder of the driven transfer roller 402 from prematurely rupturing the rupturable container 506.

Also, the surface of the collars 462, 464 constitute with a high fricture surface so as to prevent the driven transfer roller 402 from slipping on the advancing film unit 500. Some examples of friction treatment are sandblasting, micro knurling, and electro discharge machining (EDM).

Figure 10:
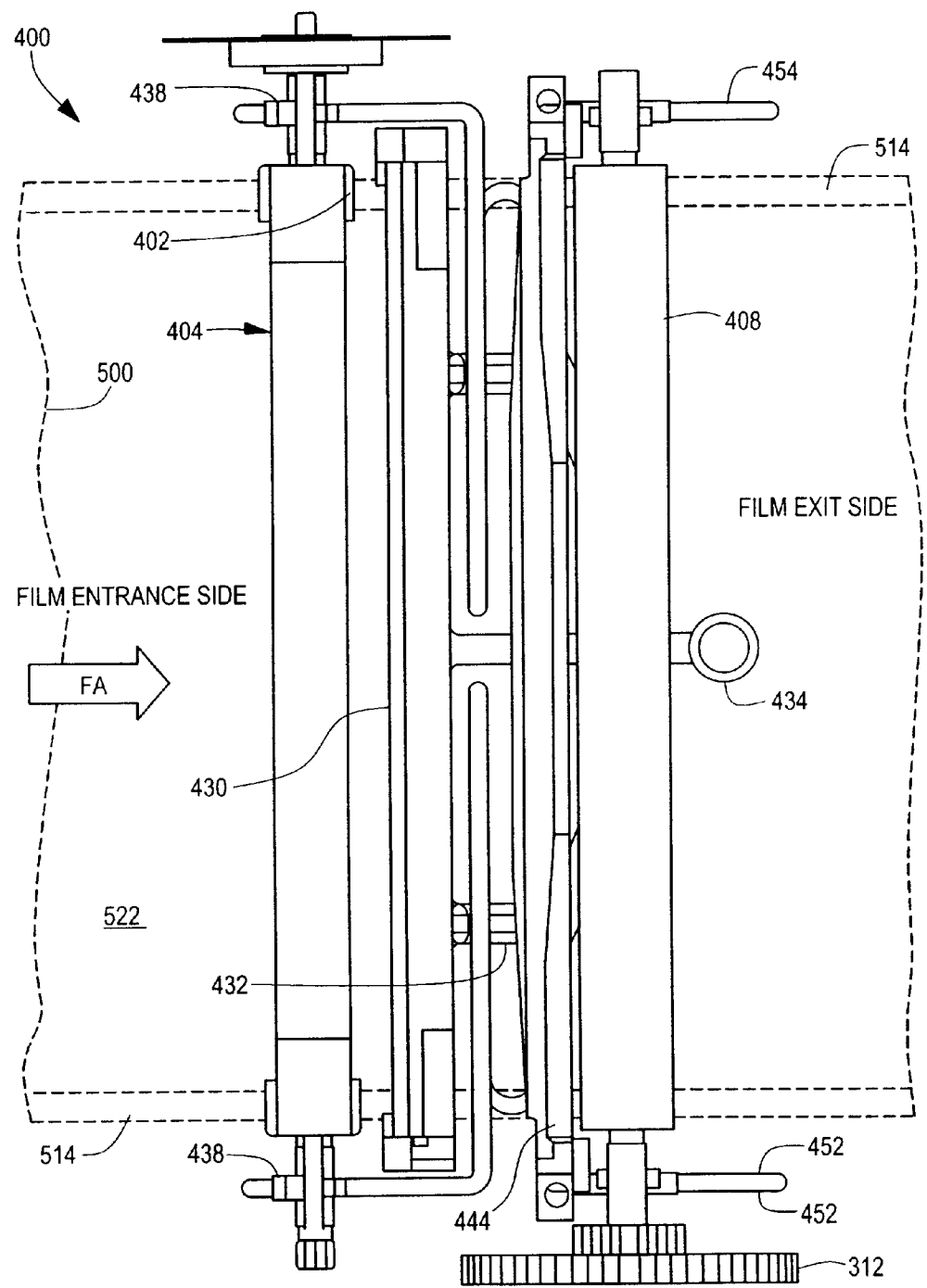

FIG. 10 illustrates the plan view of the film unit drive and processing fluid spread system sub-assemblies 400 (i.e., opposite view of that of FIG. 9) as would be viewed from the bottom side of housing 600. FIG. 10 shows the film entrance side of which the film unit 500 would enter the sub-assemblies 400, as well as the film exit side from which the film unit would exit as the film advances in the direction indicated by arrow FA. Also shown is a schematic view of the film unit 500 (backside of image area) being advanced between the follower transfer roller 404 and the driven transfer roller 402, as well as between the lower spread roller 408 and the upper spread roller 406 (not shown) wherein the film unit 500 has its lateral margins 514 respectively shown.

FIG. 11 illustrates an elevation view of the film unit drive and processing fluid spread system sub-assemblies 400 as would be viewed from the top wall 610 of the housing 600 or from the exit side. The upper spread roller 406 and the lower spread roller 408 are partly shown in a cut away section. Spread roller spacer pads 440 and 442, as shown, are adapted to establish the spreader roller pre-gap 456 between the spread rollers 406, 408.

FIG. 12 shows an elevation view (i.e., opposite view of FIG. 11) of the film unit drive and processing fluid spread system sub-assemblies 400 as viewed from the film entrance side of the sub-assemblies 400. Transfer roller spacer pads 436 and 438 are illustrated which establishes the transfer roller pre-gap 458 for spacing the driven transfer roller 402 and follower transfer roller 404 for which the film unit 500 is advanced there between.

Figure 13:
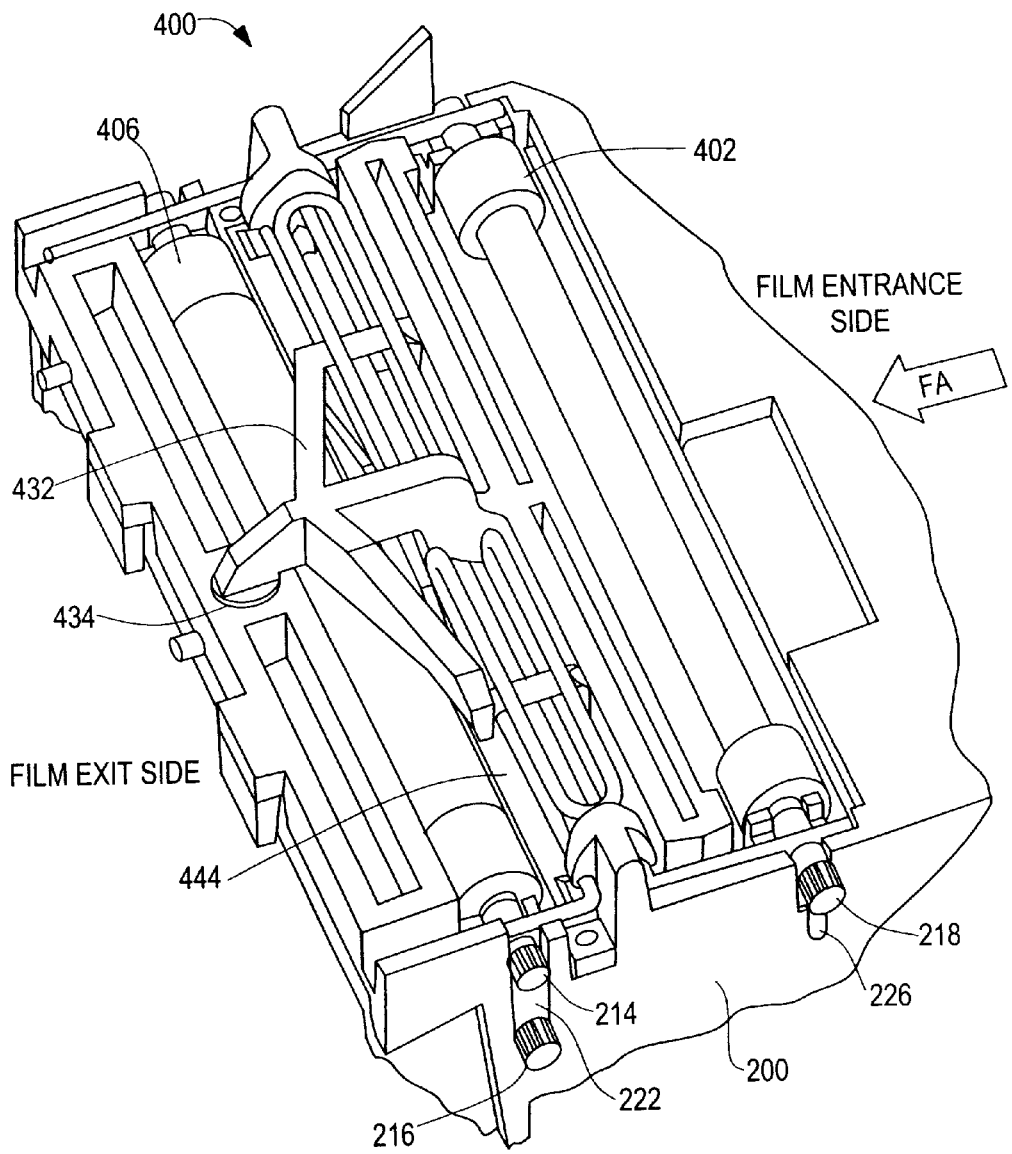
FIG. 13 is a perspective view of the film unit drive and processing fluid spread system sub-assemblies as set in the main frame (partial view) of the electronic printing system.

FIG. 13 illustrates a perspective view of the film unit drive and processing fluid spread system sub-assemblies 400 as set in the main frame 200 of the electronic printing system 1. The journals 214, 216 of the upper spread roller 406 and the lower spread roller 408, respectively, are set in the slot 222 of the main frame 200. Similarly, the journals 218, 220 of the driven transfer roller 402 and the follower transfer roller 404, respectively, are set in the slot 226 of the main frame 200.

Figure 14:
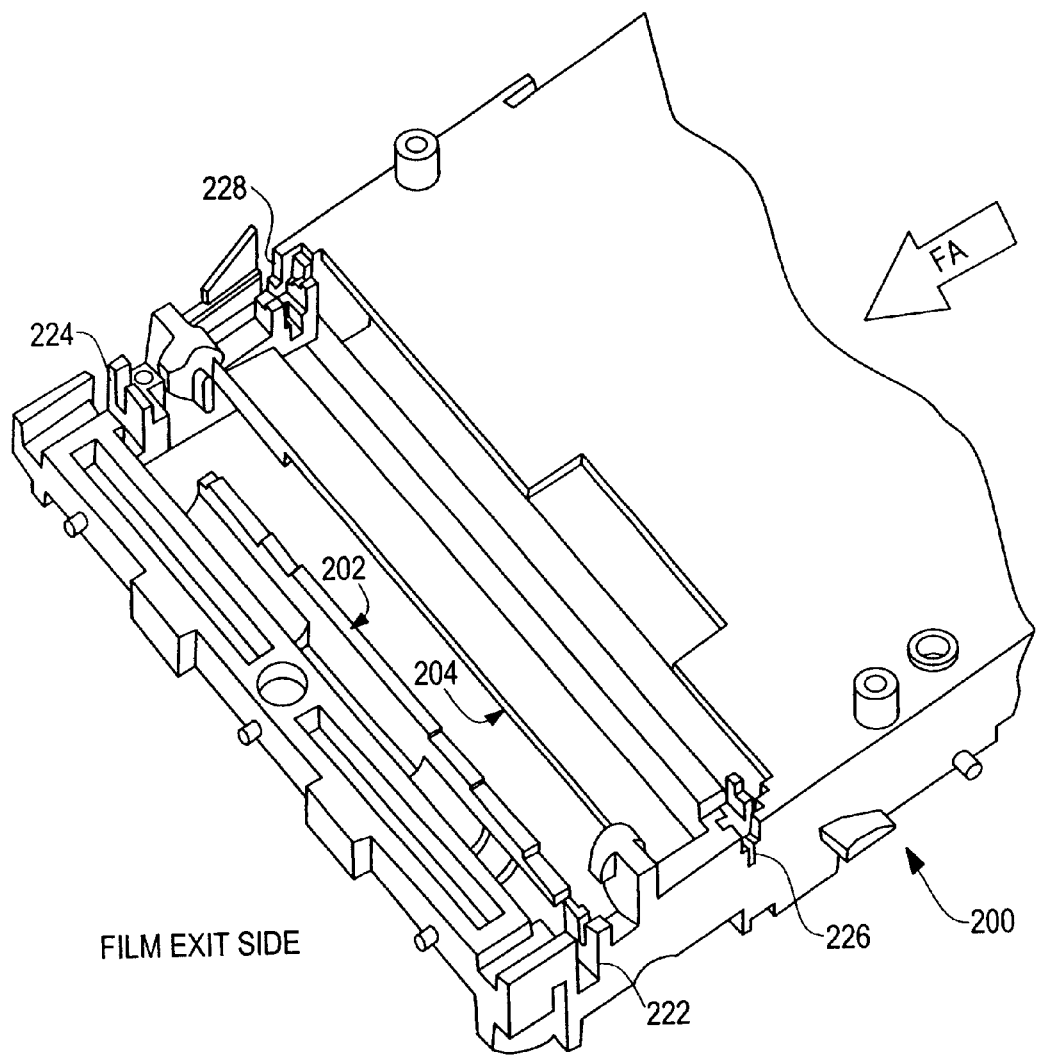
FIG. 14 is a partial perspective view of the main frame as would be viewed from the back wall of the housing, including the lower bow member and the lower clamp member.

FIG. 14 illustrates a (partial) perspective view of the top of the main frame 200 as would can be viewed from the back wall 606 of the housing 600. The main frame 200 includes the lower bow member 202 and the lower clamp member 204, which function to help control the processing fluid of the film unit 500. FIG. 14 illustrates the portions of the lower bow member 202 and the lower clamp member 204 which would contact the film unit 500 as it is advanced over the bow 202 and the clamp 204.

Figure 15:
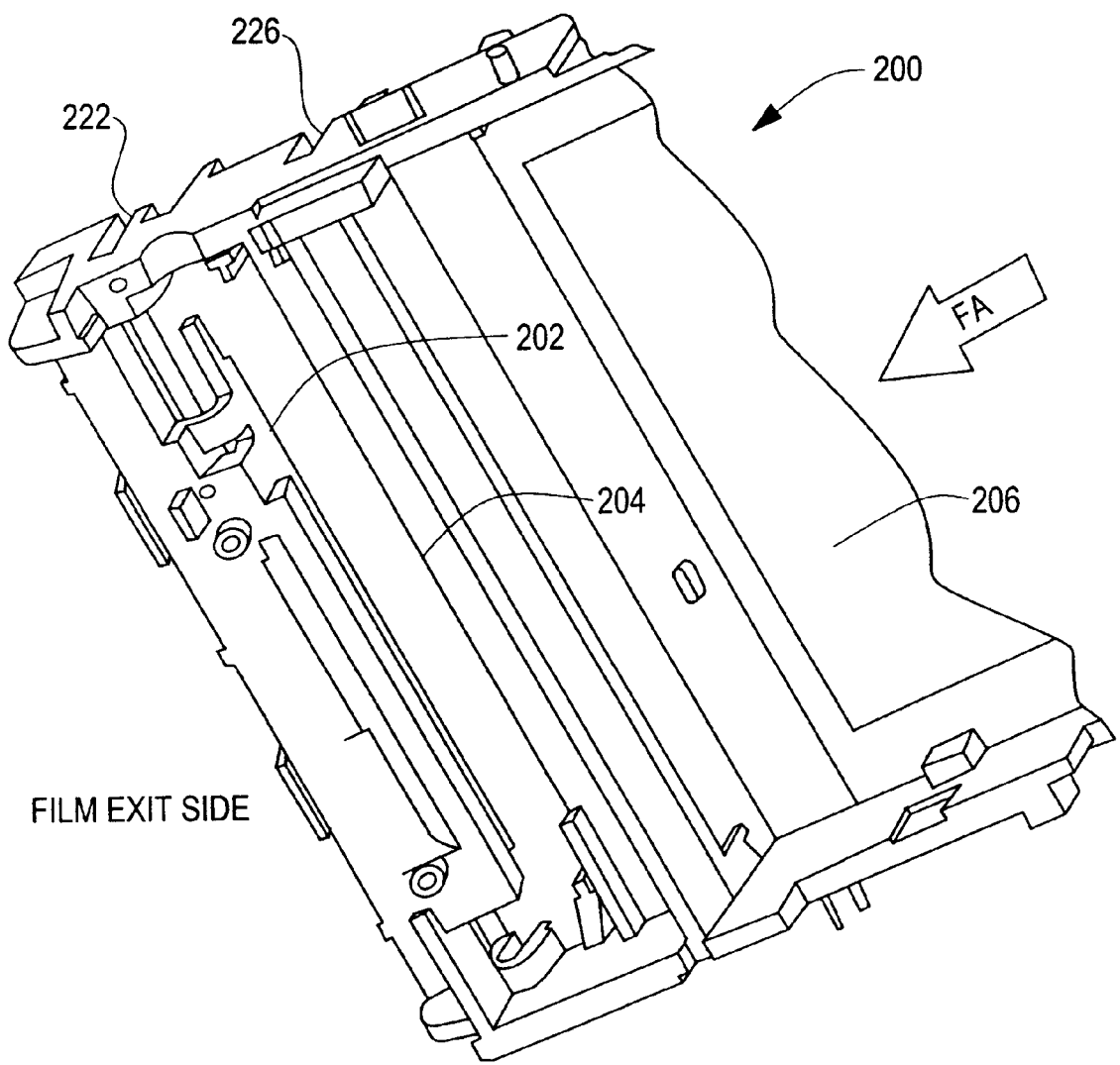
FIG. 15 is an opposite view as illustrated in FIG. 14 showing a (partial) perspective view of the main frame 200 as would be viewed from the front wall of the housing with a partial view of the cassette/door assembly chamber.

FIG. 15 illustrates a (partial) perspective view of the main frame 200 as would be viewed form the front wall 604 of the housing 600 (i.e., opposite view as illustrated in FIG. 14). In particular, FIG. 15 illustrates a partial view of the cassette/door assembly chamber 206 which accommodates the film cassette 518.

Figure 16:
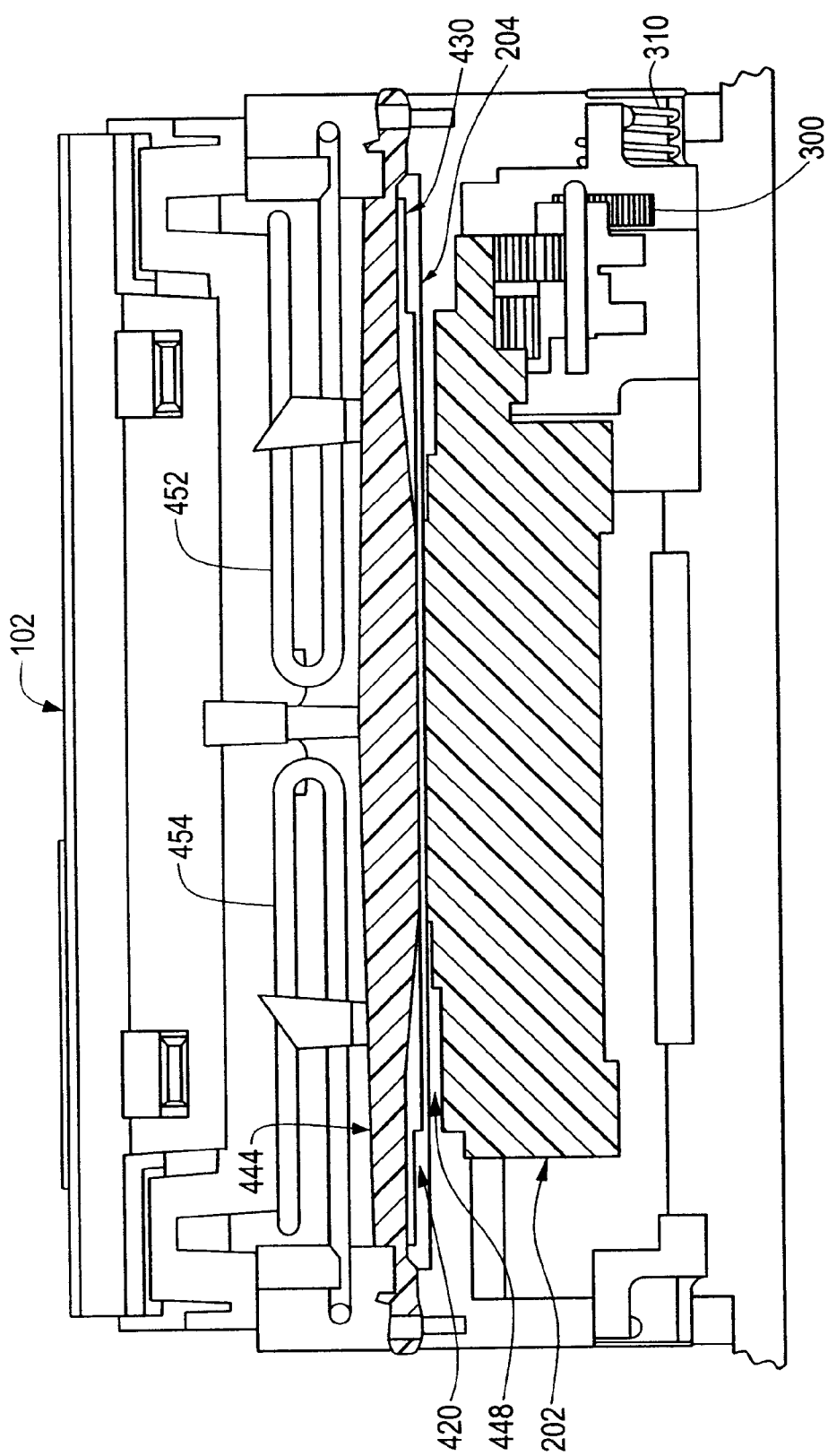
FIG. 16 is a transverse sectional view of the electronic printing system (looking in the direction of the arrows XVI—XVI of FIG. 19) showing a cross section of the lower bow member and the upper bow member with the upper and lower clamp members shown in the background.
Figure 19:
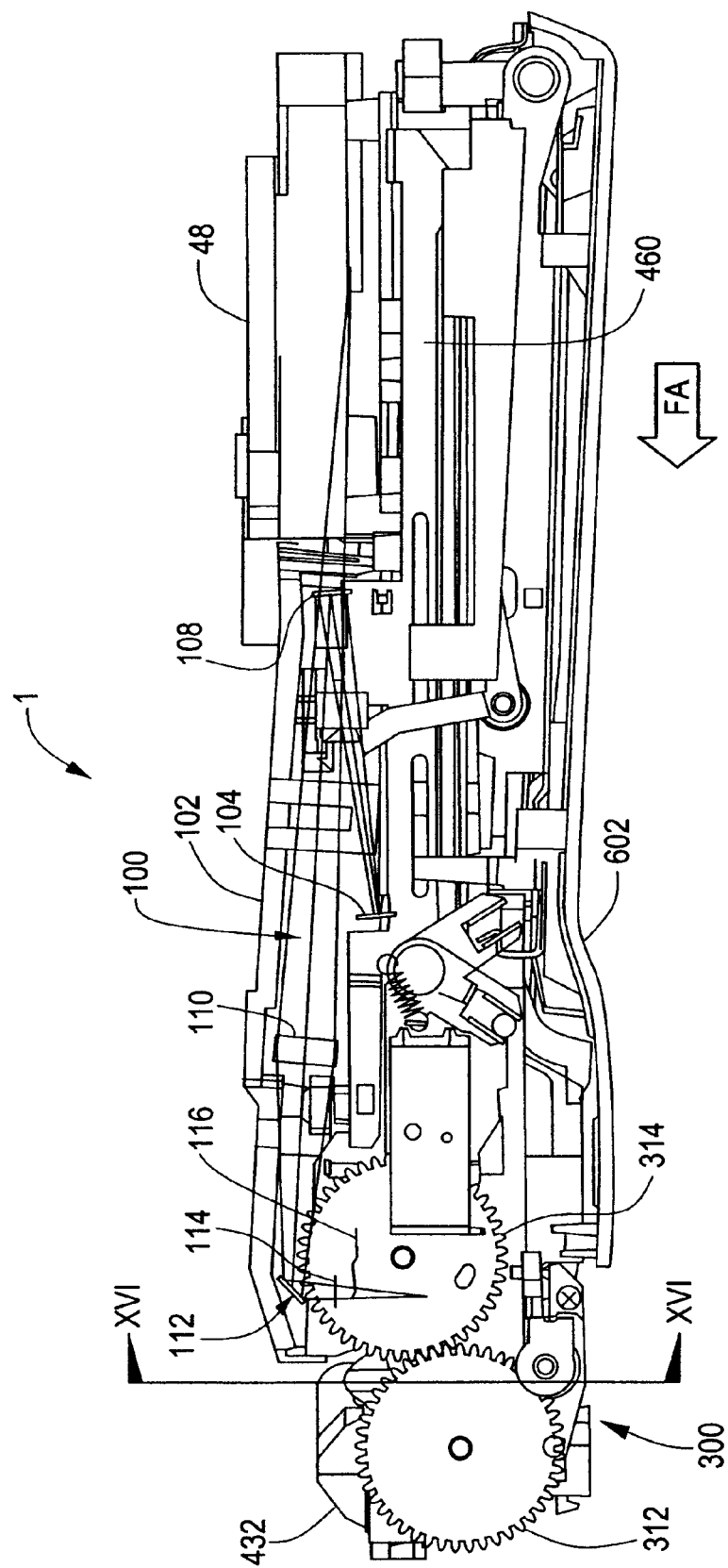
FIG. 19 is an elevation view of the electronic printing system 1 as seen from the gear train assembly side generally showing the optical assembly disposed in the optical assembly housing, the pick mechanism, the film door, and the electronic housing.

FIG. 16 illustrates a cross-sectional view of the electronic printing system 1 for the section taken in FIG. 19. FIG. 16 shows a cross section of the lower bow member 202 and the upper bow member 444. In the background of the upper and lower members 444, 202, there is shown the upper clamp 430 and the lower clamp 204. Accordingly, between the lower bow 202 and the upper bow 444 (vertically as drawn) there is established a bow pre-gap 448 through which the film unit 500 is advanced.

The bow pre-gap 448 has a predetermined nominal distance of approximately 6 to 15 mils, (at its center or medial portion) in a preferred embodiment. This range is intended to be illustrative and should not be regarded as restrictive.

Similarly, still referring to FIG. 16, between the lower clamp 204 and the upper clamp 430 (vertically as drawn) there is established a clamp pre-gap 420 through which the film unit 500 is advanced.

The clamp pre-gap 420 has a predetermined nominal distance of approximately 18–21 miles (at its center or medial portion) in a preferred embodiment. This range is intended to be illustrative and should not be regarded as restrictive.

One can observe that the lower bow has a step-like contour and the upper bow has a contour that is more smoothly tapered. The contour of the lower bow 202 and the upper bow 444 establishes a profile wherein the bow pre-gap 448 is narrowest in the medial or center portions and widest along the outer (off-center) portions and lateral margins. Next, the lower clamp 204 reveals only a straight line as viewed from this profile and the upper clamp 430 shows only a single step on each side respectively.

Figure 17:
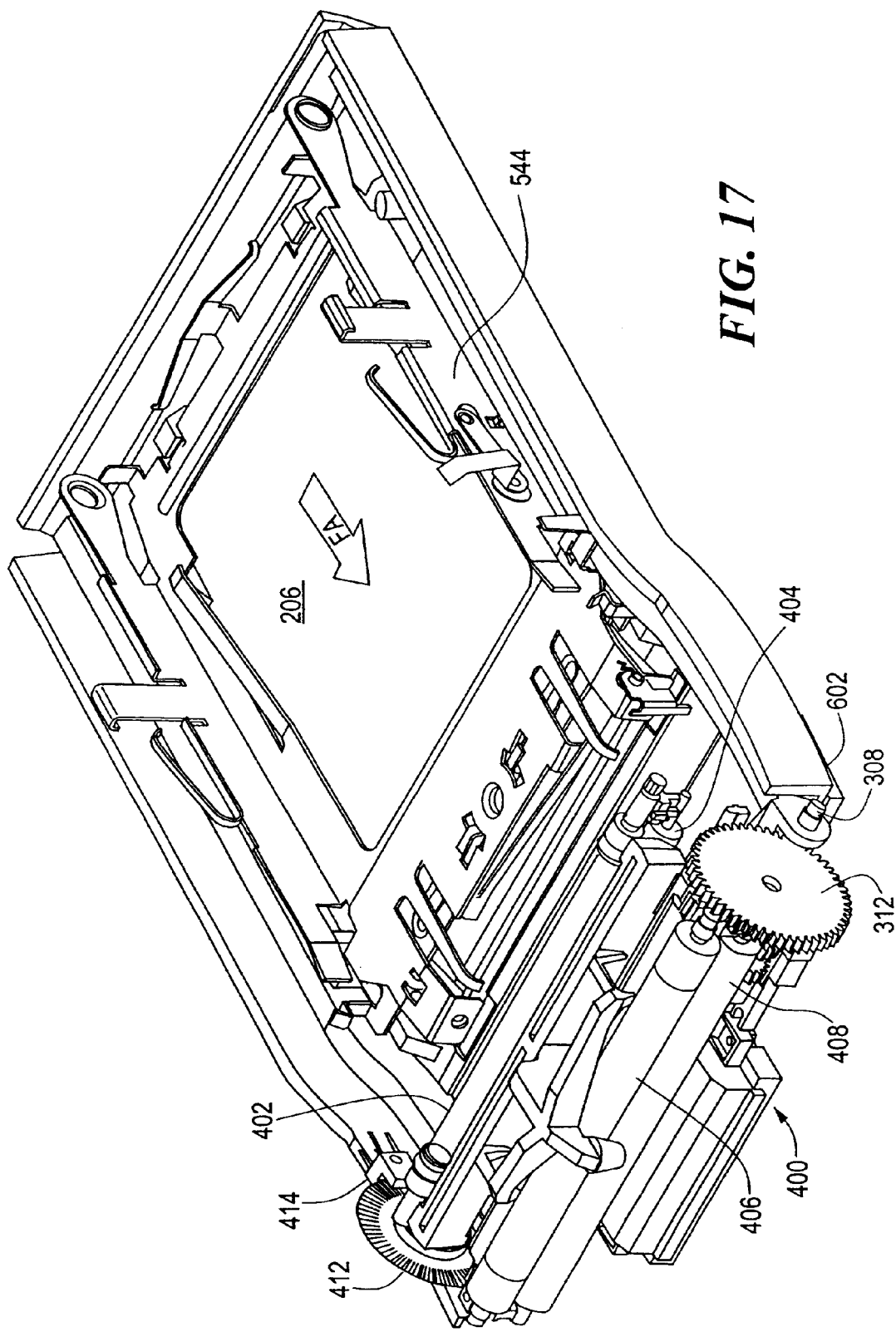
FIG. 17 is a perspective view of the select components from the film unit drives and processing spread system sub-assemblies in relation to the door cassette holder disposed on the film door.

FIG. 17 shows a perspective view of the select components from the film unit drives and processing spread system sub-assemblies 400 in relation to the door cassette holder 544 which is disposed on the film door 602 of the housing 600.

Figure 18:
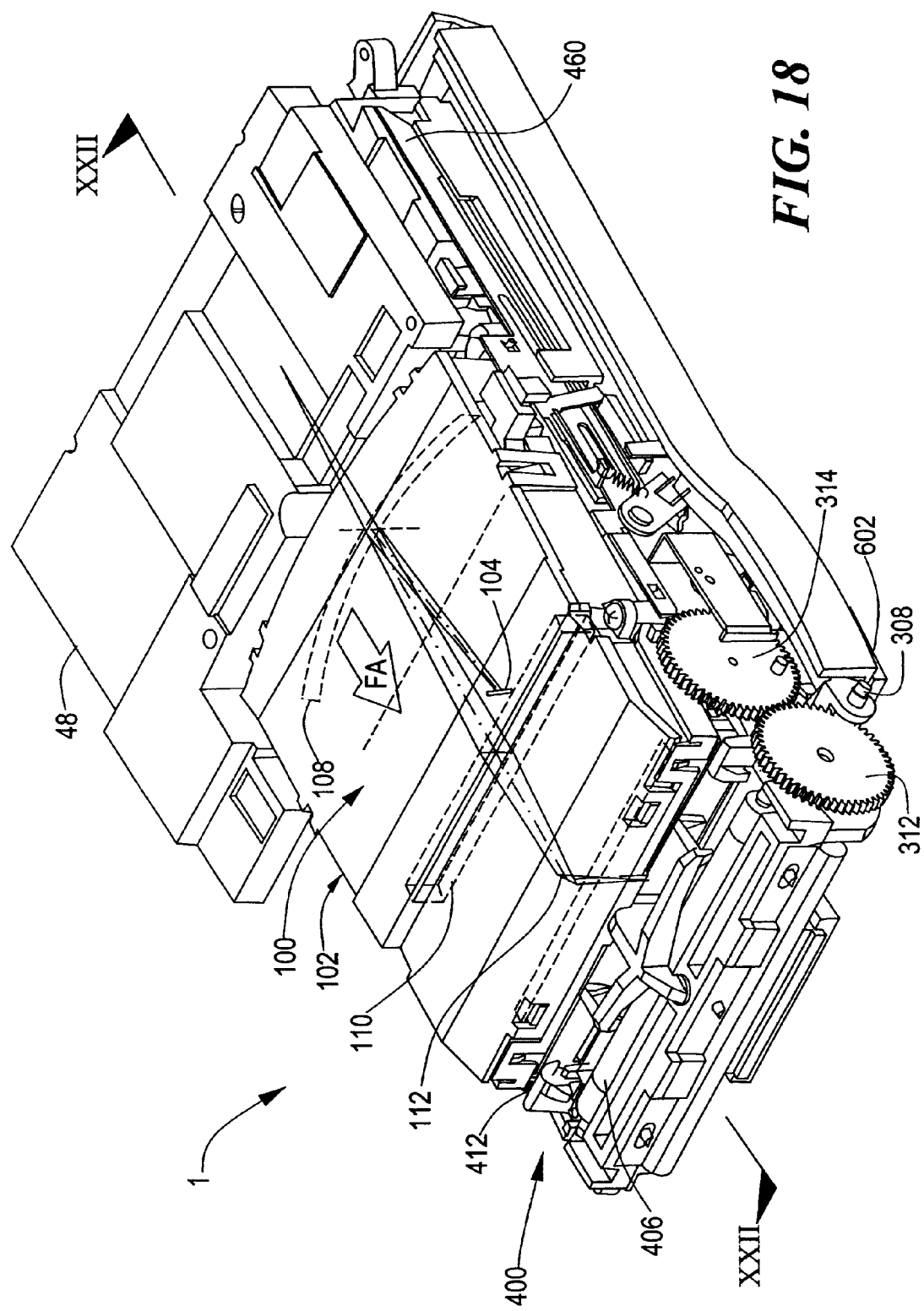
FIG. 18 is a perspective view of the electronic printing system showing the relationship of electronic housing, the optical assembly disposed in the optical assembly housing, the film unit drive and processing fluid spread system sub-assemblies, and the film door.

FIG. 18 is a perspective view of the electronic printing system 1 showing the relationship of electronic housing 48, the optical assembly 100 disposed in the optical assembly housing 102, the film unit drive and processing fluid spread system sub-assemblies 400, and the film door 602.

FIG. 19 is an elevation view of the electronic printing system 1 as seen from the gear train assembly 300 side. This view generally shows the optical assembly 100 disposed in the optical assembly housing 102, the pick mechanism 460, the film door 602, and the electronic housing 48.

Figure 20:
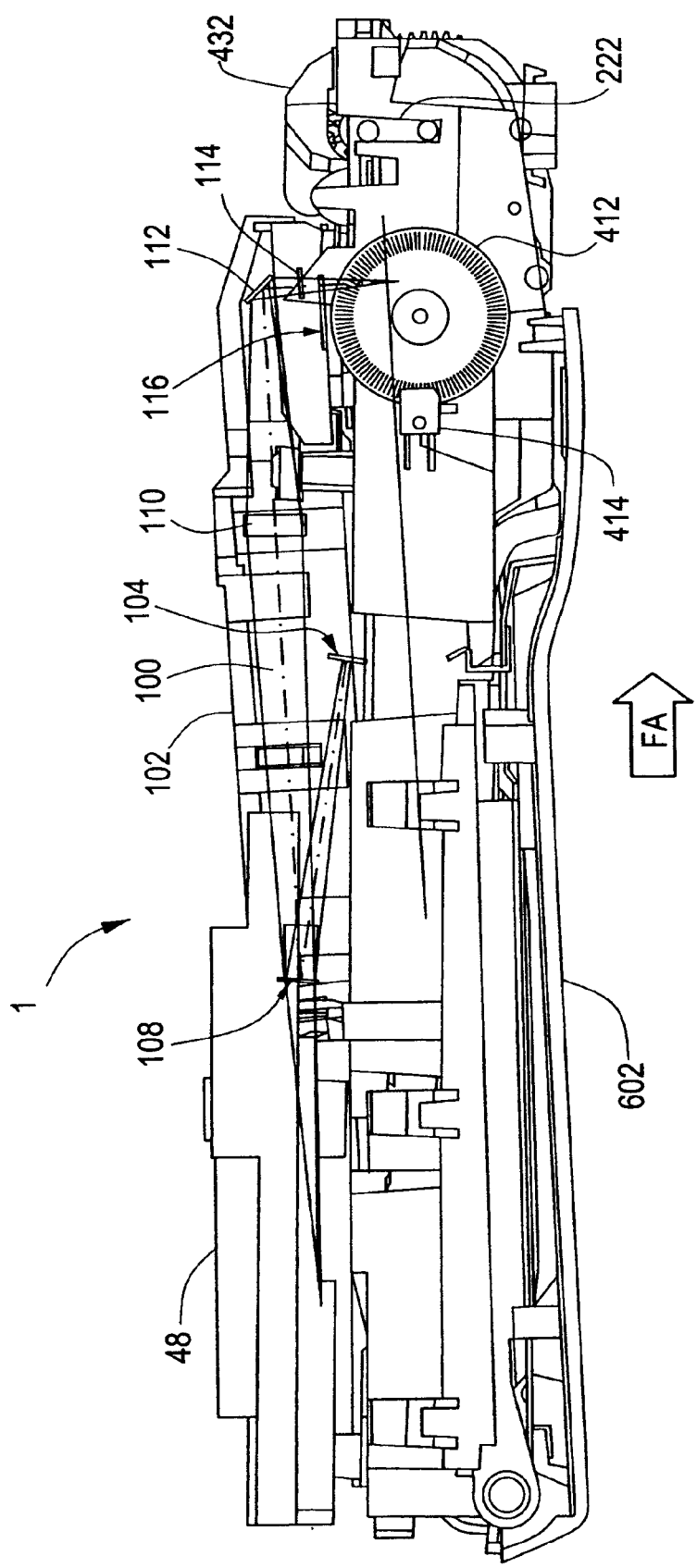
FIG. 20 is an opposite view of FIG. 19 showing an elevation view of the electronic printing system as seen from the encoder wheel side.

FIG. 20 is an elevation view of the electronic printing system 1 as seen from the encoder wheel 412 side (i.e., opposite view of FIG. 19). Also included, is a cross sectional of the optical assembly 100 disposed in the optical assembly housing 102, the electronics housing 48, and the film door 602.

Figure 21:
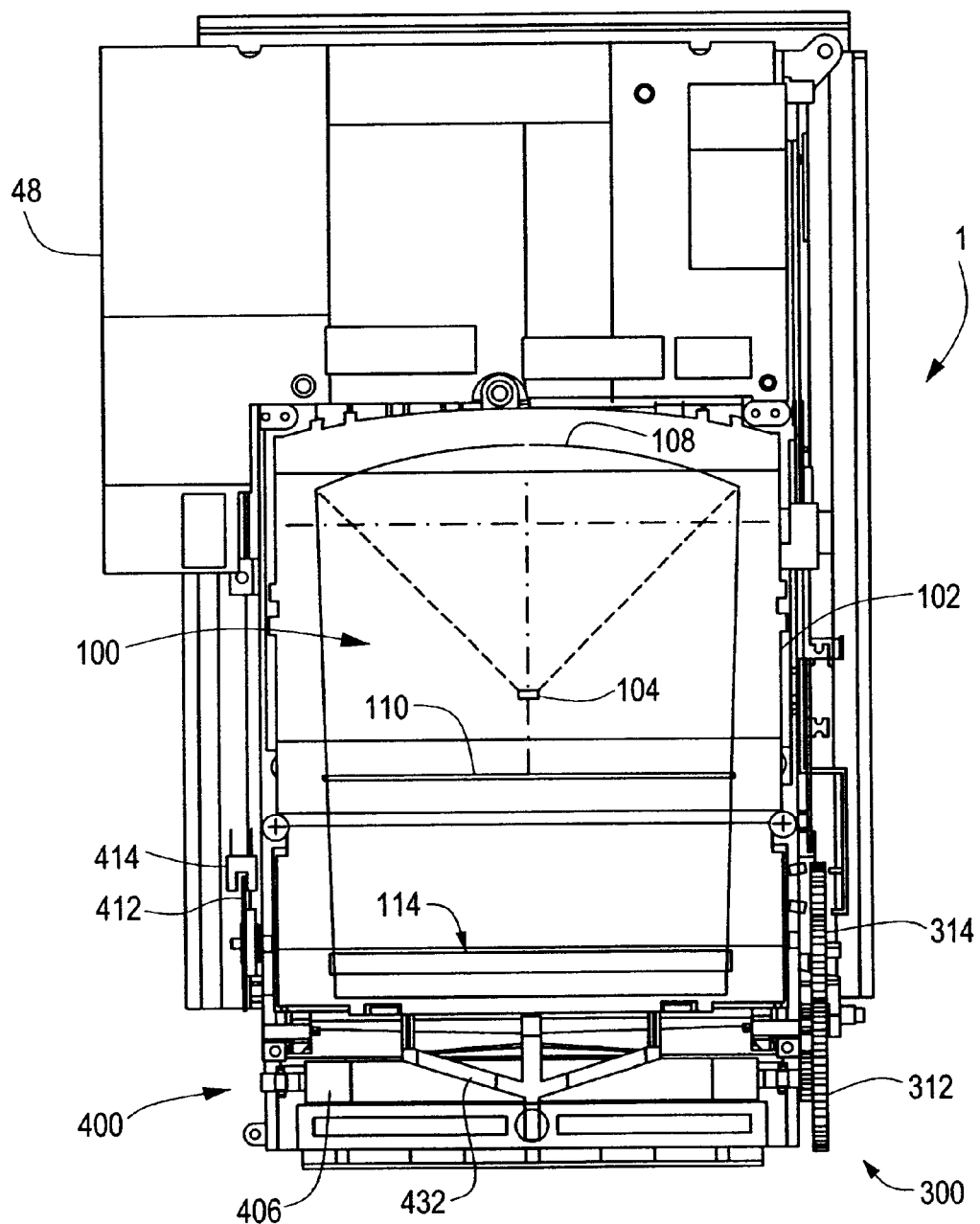
FIG. 21 is a plan view of the electronic printing system as would be viewed from back wall of the housing, including processing fluid spread system sub-assemblies, the electronic housing 48, as well as aspects of the optical assembly 100 disposed in the optical assembly housing 102.

FIG. 21 is a plan view of the electronic printing system 1 as would be viewed from back wall 606 of the housing 600. FIG. 21 shows the film unit drive and processing fluid spread system sub-assemblies 400, the electronic housing 48, as well as aspects of the optical assembly 100 disposed in the optical assembly housing 102.

Figure 22:
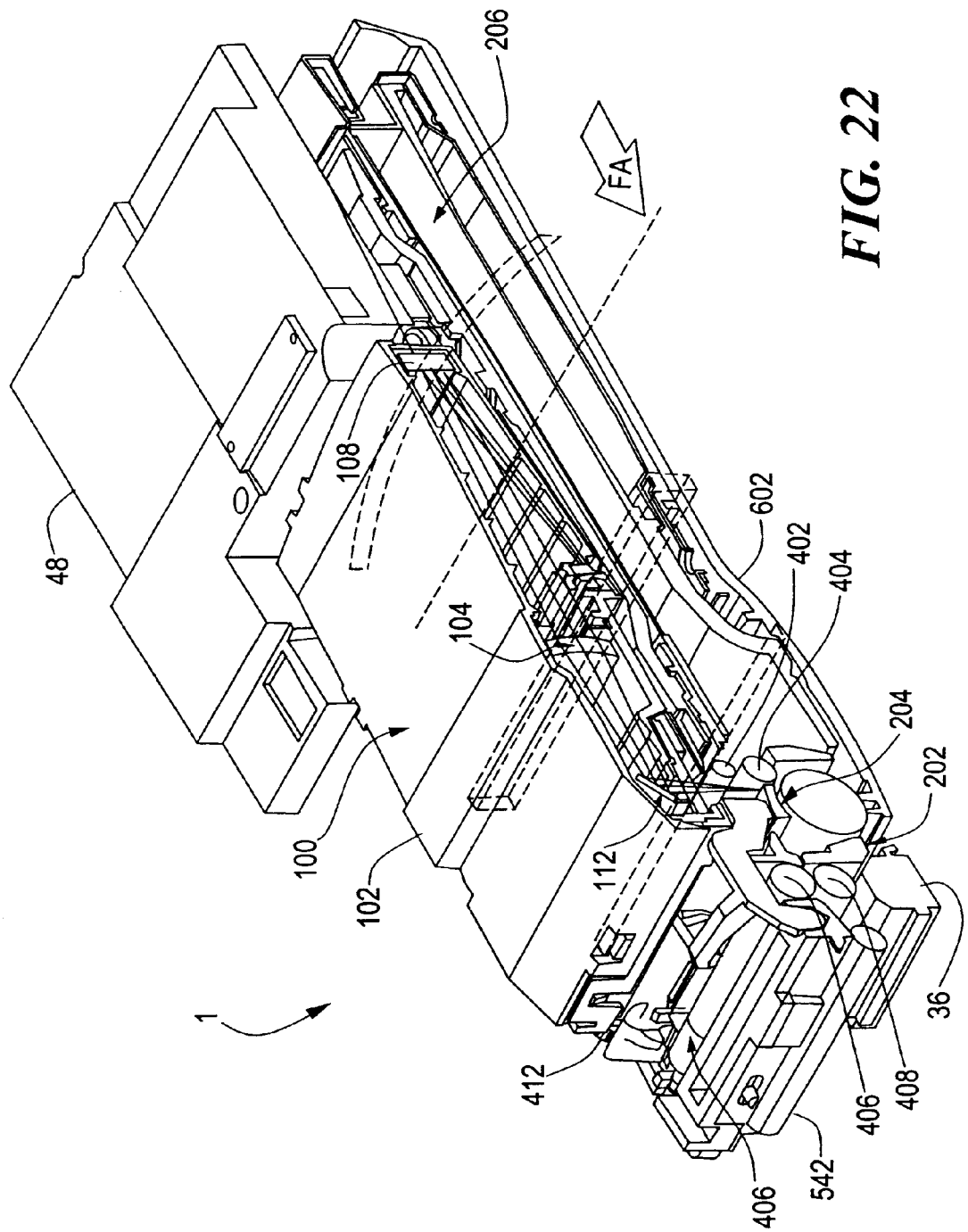
FIG. 22 is a perspective longitudinal sectional view of the electronic housing, (looking in the direction of the arrows XXII—XXII of FIG. 18) showing the optical assembly and the film unit drive and processing fluid spread system sub-assemblies.

FIG. 22 illustrates a perspective cross-sectional view with the electronic housing 48, the optical assembly housing 102 having its optical assembly 100 disposed therein, the film door 600, and the film unit drive and processing fluid spread system sub-assemblies 400.

Figure 23:
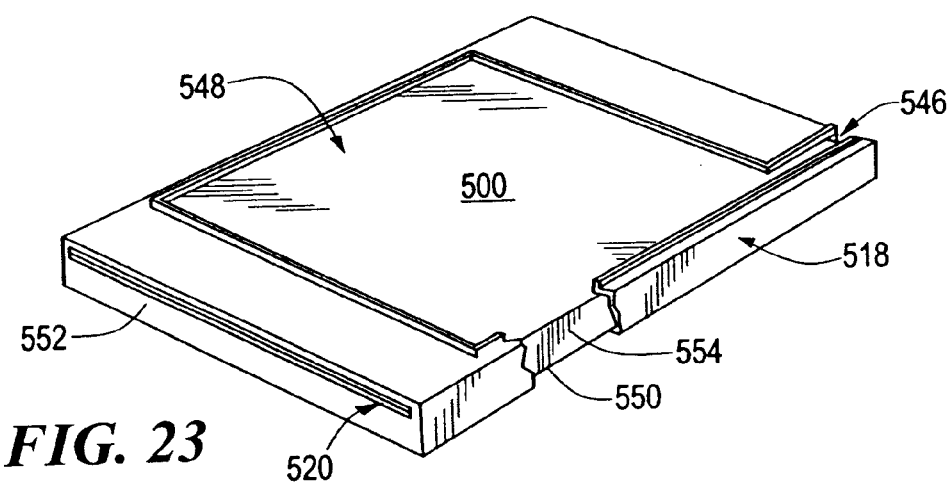
FIG. 23 is a perspective view of the film cassette with a partial cross section showing a stack of film units therein.

FIG. 23 illustrates a film cassette 518 which would be manually loaded into the door cassette holder 544 that is adapted to be disposed on the film door 602. The film cassette 518 is designed for a stack 554 of film units 500. The stack 554 shown in FIG. 23 includes a top film unit 548 and the bottom film unit 550. During operation of the electronic printing system 1, a pick mechanism 460, as known in the art, advances the top film unit 548 through the film withdrawal slot 520 of the front wall 552 of the film cassette 518. The pick mechanism 460 advances the top film unit 548 far enough so as to be engaged within the transfer nip 450 of the driven transfer roller 402 and the follower transfer roller 404 for further advancement.

Figure 24:
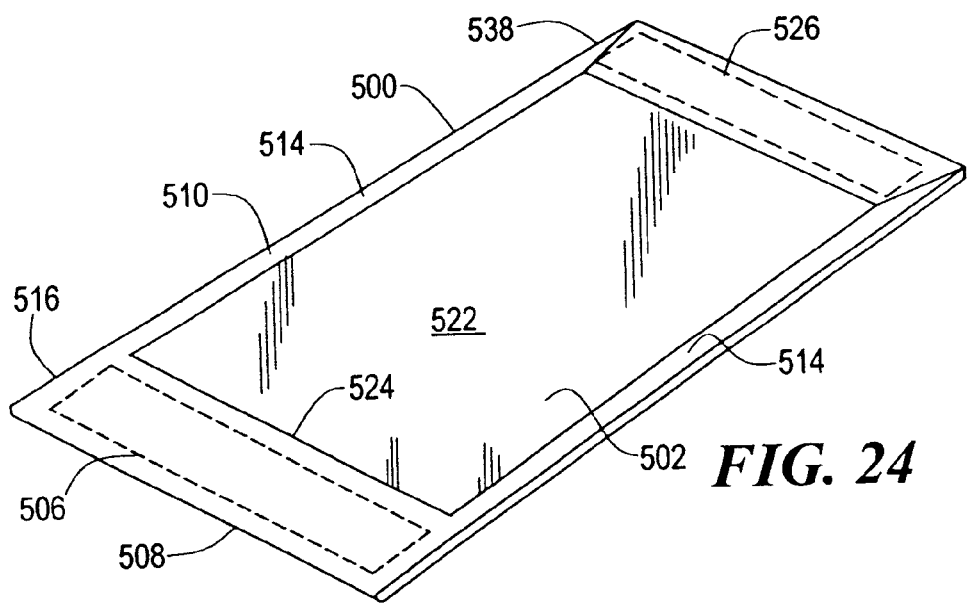
FIG. 24 is a perspective view of a film unit having a leading longitudinal margin, a trailing longitudinal margin, and lateral margins on its respective sides.

FIG. 24 illustrates a perspective view of a film unit 500 having a leading longitudinal margin 516, a trailing longitudinal margin 538, and lateral margins 514 on its respective sides. Also shown is the image forming area 522 of the transparent top sheet 502. The leading edge 508 of the film unit 522 indicates where the film unit enters the transfer rollers 402, 404. The leading longitudinal margin 516 has a rupturable container (pod) 506 disposed therein for containing the processing fluid. The trailing longitudinal margin 538 contains a trap 526 adapted for holding any excess processing fluid therein. The margins collectively serve as a mask 510 defining the aperture for image forming area 522 and serves to bind the top sheet 502 and negative sheet 504 together, as will be discussed in greater detail below.

Figure 25:
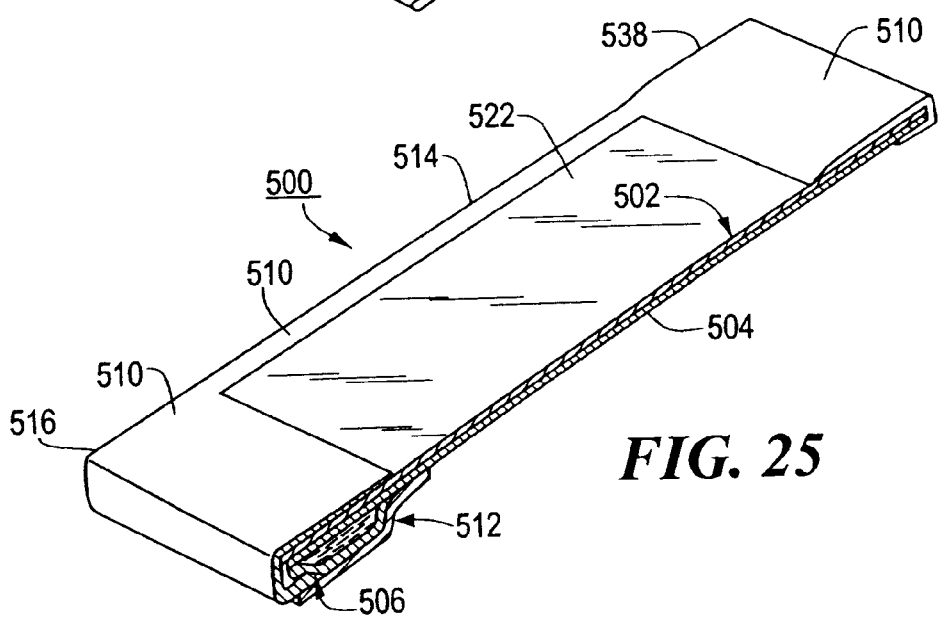
FIG. 25 is a cross sectional area of the film unit as shown previously in FIG. 24.

FIG. 25 shows a cross sectional area of the film unit 500 as shown previously in FIG. 24. As illustrated, the film unit 500 has a leading longitudinal margin 516 and a rear longitudinal margin 538, as well as lateral margins 514 which together combine to form the mask 510. A top sheet 502 (transparent) is superimposed with a bottom negative sheet 504. For the leading longitudinal margin 516, therein contains a rupturable container 506 (having a top and bottom layer) containing the processing fluid. The mask 510 partially wraps around the rupturable container 506. And outside the layers of the container 506 is shown a tape layer 512 which connects the mask 510 with the bottom negative sheet 504. Referring to the trailing longitudinal margin 538, the mask 510 wraps around the top sheet 502 and the bottom sheet 504. The trailing longitudinal margin 538 acts as a trap 512 for collecting any excess processing fluid at the end of the processing and spreading operation.

As noted earlier, it is desirable that the layer of processing fluid between the sheet elements 502 and 504 be of uniform thickness over the entire image forming area 522 to obtain an optimum quality positive print. It was also noticed that the uniformity of the liquid layer is influenced by the initial shape of the wave front of the mass of process fluid as it is discharged from the rupturable container (pod) 506.

Different types of film units 500 tend to have different initial wave front shapes due to variances in their pod design, pod seal rupturable characteristics, the amount and viscosity of the liquid processing composition enclosed by the pod, and the resistant to the fluid flow at the inner face between the fluid and the superposed elements forming their laminate.

A commonly observed wave front is illustrated in FIGS. 26(A) and (B), as designated by the dotted lines. FIG. 26(A) illustrates the pod that has a single rupture, whereas FIG. 26(B) illustrates a pod which has a double rupture. In either case, it is a tongue-shaped or bow-shaped wave that the processing liquid initially tends to move toward the trailing end or the downstream end (as designated by the arrow DS) of the film unit 500. The liquid tends to move more rapidly at the center portion of the image forming area 522 than at the outer (off-center) portions and lateral margins 514 thereof. This condition can generally be attributed to the fact that the superposed sheet like elements 502, 504 are held together at their lateral margins 514 so as to bind them together, while the medial portions or center portions of the sheet elements 502, 504 are free to separate slightly in response to the rearward discharge of the processing fluid between the sheet elements 502, 504. The slight difference in spacing between the lateral edges and the medial portions of the sheet elements 502, 504 is sufficient to cause a reduction in fluid flow resistance in the middle of the image forming area 522.

As a film unit 500 is advanced in the film advancement direction as indicated by the arrow FA, the spread rollers 406, 408 progressively spread the fluid (as designated by the dotted lines in FIGS. 26(A) and (B)) towards the trailing longitudinal margin 538, which includes the trap 512 for collecting and retaining the excess processing fluid. Because there is an uneven lateral (or transverse) distributional fluid, there may be an absence of processing fluid near the corners of the image forming area 522 at the trailing edge of the image forming area 556 and the leading edge of the image forming area 524. As such, defects would be present at the corners of both the leading longitudinal margin 516 and the trailing longitudinal margin 538.

Figures 27A, 27B:
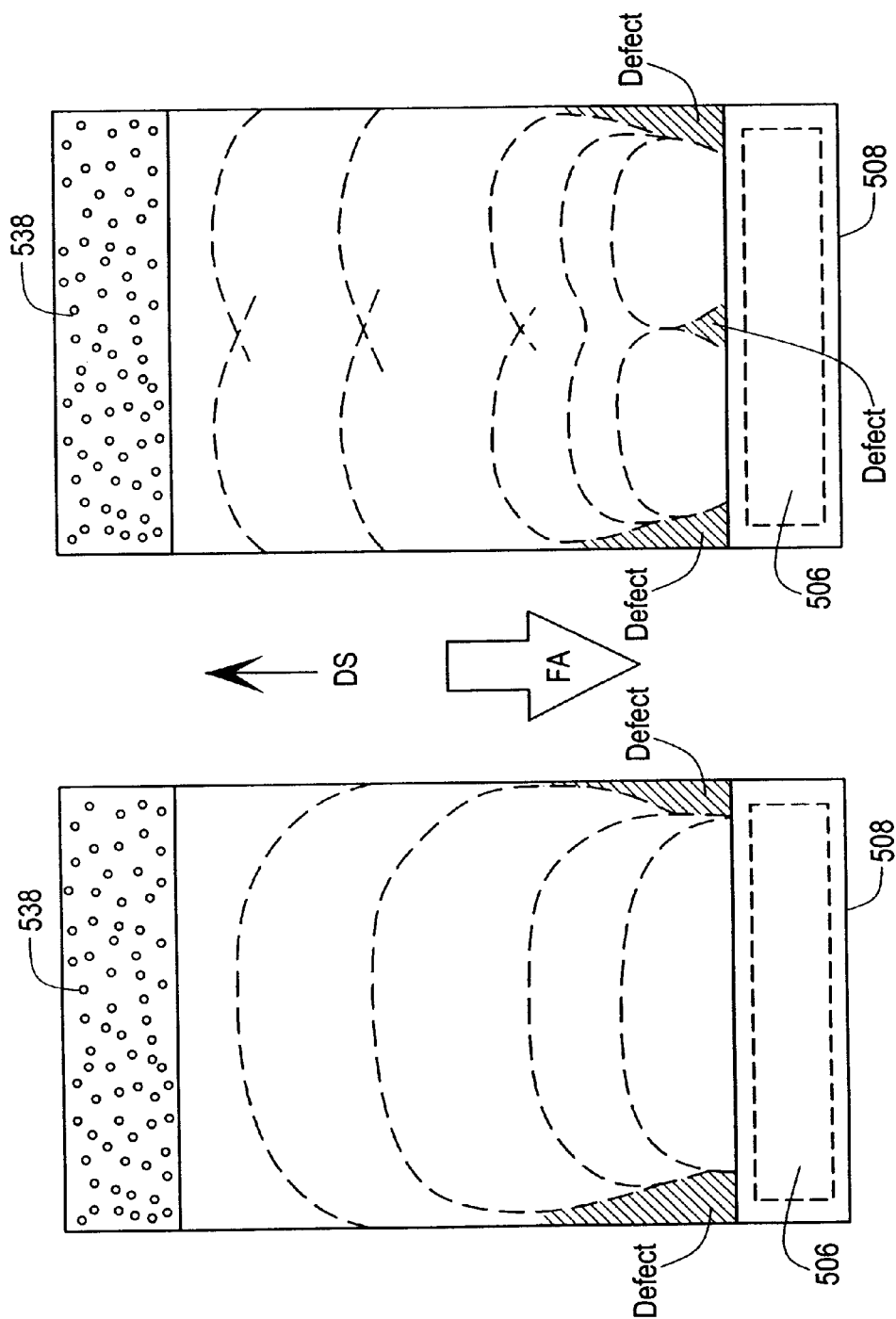
FIGS. 27 (A) and (B) are plan views of a film unit showing the progressive advancement of a liquid wave front, in dotted lines, to illustrate the distribution of the processing fluid when the third constraint member is not utilized in the spread system.

Turning to FIGS. 27(A) and (B), in order to control the distribution of the processing fluid as it is spread by the pair of spreading rollers 406, 408 within the electronic printing system 1, a second constraint 50 is provided in a preferred embodiment of the present invention for distribution control purposes. This second constraint 50 consists of the lower bow member 202 and the upper bow member 444. The second constraint 50 as provided by lower bow 202 and the upper bow 444 provides an opposition to the flow of processing fluid received downstream (as indicated by the arrow DS) from the spreading means (spread rollers 406, 408). In essence, the medial portions of the top and bottom sheets 502, 504 are urged together which in effect limits the allowable separation of the sheet elements 502, 504 the center of the film unit, and thereby selectively increases the center resistance to the fluid flow. As the processing fluid flows in the downstream direction between the sheet elements 502, 504, the increase flow resistance imparted by the second constraint 50 selectively retards the center of the liquid wave front and causes a flow of fluid outwardly or in a transverse direction towards the lateral margins 514, thereby resulting in a more even lateral distribution of fluid as can be seen in FIGS. 27(A) and (B). However, unlike U.S. Pat. No. 3,832,731 entitled "Photographic Film Assemblage", assigned to the same assignee as the present invention, this second constraint 50 does not entirely eliminate the associated processing fluid defects. For instance, FIGS. 27(A) and (B) illustrate defects at the corners of the leading edge image forming area 524.

As mentioned previously, the unconventional slow rate of film advancement of the present invention causes unusual spreading dynamics. For example, the rate of advancement could be one tenth the rate of commonly known systems in the conventional art.

The solutions proposed in the prior art will not compensate for the unusually slow speed of the film advancement in the present invention. Also, the solutions proposed in the prior art do not account for the accuracy of the film advancement necessitated in the present invention, i.e., the present invention has the film unit 500 advancing simultaneously while it is being exposed by the print head 118, effecting an exposure line-to-line spacing of 120 $\mu$m center-to-center on the film unit 500.

The present invention is concerned with a film unit 500 that advances an unconventionally slow rate of speed. In addition, the film unit while advancing the unusual slow rate, must also advance at a nominal rate with extremely high accuracy. As such, the present invention needed to successfully spread processing fluid without causing undo drag or interference on the advancing film unit. Any excessive drag or interference would detrimentally affect the accuracy of the film advancement, thus causing artifacts in the exposure of the image on the film unit.

Moreover, the wave extent must be controlled so as to not encroach on the exposure line being created simultaneously.

An advantage of the present invention is provided by a third constraint 52 as affected by the lower clamp 204 and the upper clamp 430. The lower clamp 204 and the upper clamp 430 provides a third constraint 52 to selective portions of the film unit 500 to oppose the flow of the processing fluid that is received downstream (as indicated by the arrow DS) from the second constraint means (lower bow 202 and upper bow 444) so as to contain the wave front of the processing fluid within a predetermined longitudinal distance from the spread rollers 406, 408. This predetermined longitudinal distance defines the wave extent by which the processing fluid flow can not exceed so as to prevent the processing fluid from encroaching on the line of exposure 534 that is being emitted by the print head 118 onto the image forming area 522 while the film unit 500 is advancing.

Figure 28B:
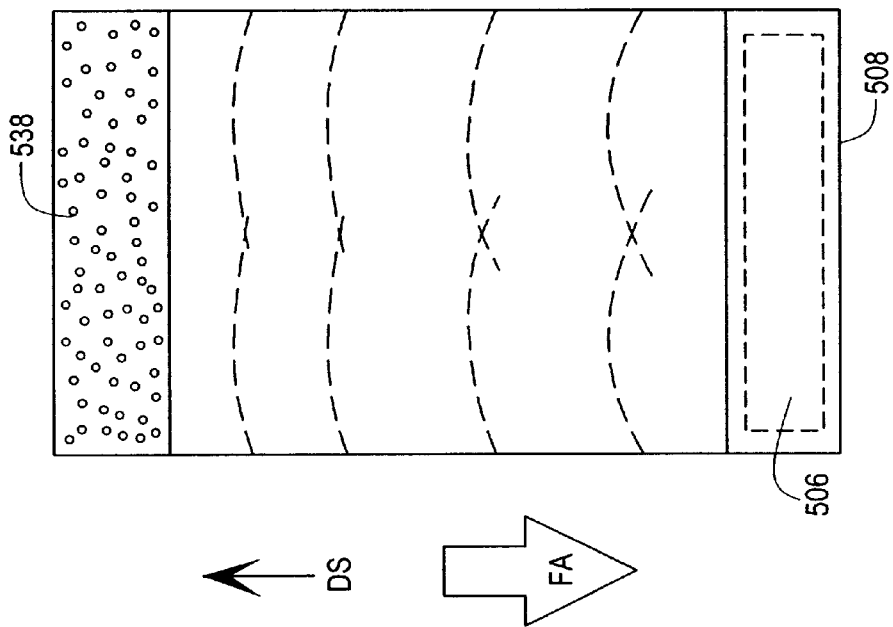
FIGS. 28 (A) and (B) are plan views of a film unit showing progressive advancement of a liquid wave front, in dotted lines, showing the modification of the shape of the wave front caused by the second and third constraint members.
Figure 28A:
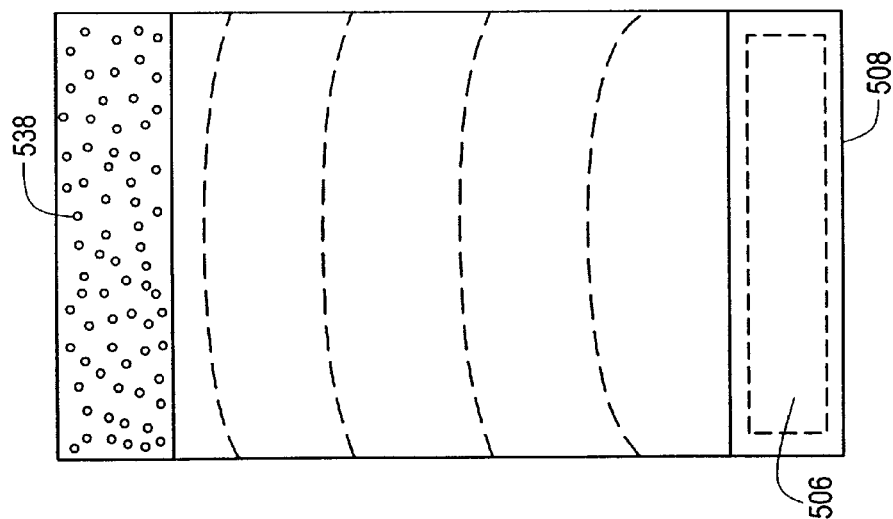

Besides the lower and upper clamps 204, 430 acting to constrain the processing fluid wave extent, the lower and the upper clamps 204, 430 also act so as to assist the transverse flow of the processing fluid so that the processing fluid will coalesce and merge into a pool. This coalescence or pool formed will then force the processing fluid to move towards the lateral margins 514. As shown in FIGS. 28(A) and (B), the wave front is substantially straight and substantially normal to the direction of the film advancement, thus providing complete and uniform coverage over the entire image area 522. Note, the predetermined load force that the upper and lower clamps exert cannot be so great so as to cause the rupturable container (pod) 506 to prematurely burst during the processing.

Figure 29:
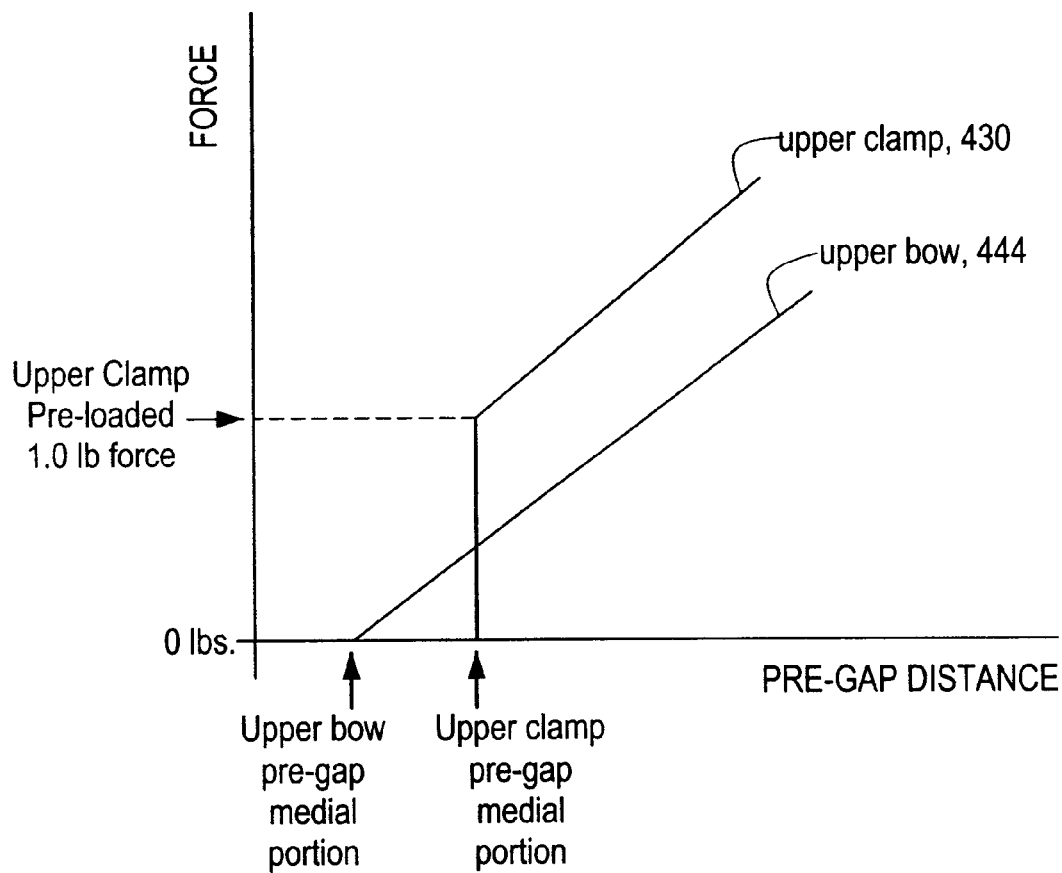
FIG. 29 is a graph illustrating the relationship of the forces exerted by the upper clamp and the upper bow in terms of their pre-loaded forces.

FIG. 29 illustrates the relationship of the forces exerted by the upper clamp 430 and the upper bow 444 in terms of their pre-loaded forces, i.e., the forces which these members exert prior to a load or the film unit 500 being advanced against these members. Referring to the graph in the FIG. 29, the upper bow 444 has a compliant force commencing at 0 lbs. at its pre-gap (bow pre-gap 448) and increases thereafter as film unit 500 exerts a force as it is advanced therethrough the bow pre-gap 448. Moreover, the upper bow 444 is fixedly attached at its respective ends, but demonstrates a compliant constraint due to the flexible properties of its material composition.

Turning to the upper clamp 430, the upper clamp is pre-loaded at approximately 1.0 lbs., i.e., 0.50 lbs. on each respective side, due to the spring system (torsional springs 452, 454) biasing the clamp 430. The upper clamp 430 exerts approximately 1.0 lbs. at its medial portions of the clamp pre-gap 420. Once the forces exerted by the film unit 500, as it is passed through the clamp pre-gap 420 exceeds 1.0 lbs. then the upper clamp 430 begins to demonstrate a compliance force as the spring system 446 (torsional spring 452, 454) biases the clamp 430.

In summary, the embodiments of the present invention described above provide a number of significant advantages. For instance, an advantage of the present invention is that it provides a processing fluid spread system that spreads the processing fluid on an advancing film unit without interfering with a stationary print head that is simultaneously exposing the advancing film unit by emitting consecutive lines of image on the film unit.

Another advantage of the present invention is that the fluid spread system is able to prevent the liquid wave front, that is caused by the ruptured container from encroaching on the line of exposure emitted by the print head on the advancing film unit. Thus, the permitted wave extent/front of the present invention is significantly less than the wave extent/front of the prior art.

Still yet, another advantage of the present invention fluid spread system is that it can process an advancing film unit that is simultaneously being exposed by a print head. In particular, it can control the thickness of the processing fluid layer in a uniform manner, as well as restrict the associated wave front of the processing fluid as the film unit is advanced at a rate considerably slower than the conventional art, for example one tenth of the conventional rate.

Further yet, an advantage of the present invention is that it can operate with the print head, effecting an exposure line-to-line spacing of at least 50 µm center-to-center, on the film unit.

Moreover, an advantage of the present invention is that it is efficient in size and power requirements since the processing and exposing is simultaneously combined during operation. As a result, the system is also cost effective to manufacture. Finally, the system is readily portable for the user to carry.

The invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims rather than by the foregoing description, and all changes which come within the meaning and range of equivalency of the claims are therefore intended to be embraced herein.

We claim:

1. An electronic printer for printing photographs having a processing fluid spread system disposed in a housing that is used for spreading the processing fluid of a self-processable film unit so that the film unit may be processed, said self-processable film unit is of the type including a pair of sheet elements and a rupturable container of the processing fluid positioned adjacent to a leading edge of the film unit, and wherein said electronic printer further includes a stationary print head suitable for emitting consecutive lines of image data on said film unit to expose said film unit while said film unit is advanced proximately to said print head, said electronic printer comprising:

means for advancing the film unit along a predetermined advancement path whereby the film unit is simultaneously exposed by said print head and processed by said spread system, and wherein said spread system comprises:

means for spreading the processing fluid in a thin layer between the sheet elements, a pair of elongated juxtaposed pressure applying members which define an elongated spreader gap through which the film unit is advanced by said advancement means with the sheet elements in superposed relationship to apply a first constraint to the film unit to first rupture the container to release the processing fluid and then to cause the released mass of processing fluid to flow downstream between the sheet elements opposite to the direction of advancement of the film unit through said spreader gap such that the processing fluid is progressively deposited between the sheet elements as a thin layer extending over a preselected area of the sheet elements which has been exposed by said print head;

means for applying a second constraint to selective portions of the film unit to oppose the flow of the processing fluid, received downstream from said spreading means, relative to the sheet elements as the film unit is advanced through said spreader gap so as to cause said processing liquid to flow transversely to said direction of advancement of the film unit; and means for applying a third constraint to selective portions of the film unit to oppose the flow of the processing fluid, received downstream from said second constraint means, so as to contain a wave front of the processing fluid within a predetermined longitudinal distance from said spreading means, thereby defining a wave extent, and to assist the transverse flow of the processing liquid by causing the processing liquid to coalesce or merge and flow transversely.

2. The spread system of claim 1 whereby said pressure applying members are also adapted for assisting the advancement of said film unit, wherein said pressure applying members comprise:

an upper spread roller and a lower spread roller rotatably mounted to said housing, said spread rollers are spaced apart to provide a spread nip for receiving the leading edge of said film unit received from said advancing means and for feeding said film unit between said pair of spread rollers.

3. The spread system of claim 1, wherein said second constraint means comprises a pair of juxtaposed upper and lower bow members mounted to the housing resulting in a bow gap there between said bow members, said bow members having linear portions extending transversely across the path of advancement of said film unit and between which said film unit is advanced.

4. The spread system of claim 3, wherein said upper and lower bow members are configured so that their center portions, corresponding with the medial portions of said film units, have a larger extension toward the other respective said bow member and their lateral portions, corresponding with the outer portions of said film units, have a smaller extension toward the other respective said bow member, whereby said configurations of said bow members result in the bow gap being narrowest in the center portions and being widest at the outer portions, said configurations of said bow members effecting the flow of the processing fluid in a wave front substantially parallel to said bow members in said transverse direction so as to cause the processing fluid to flow laterally.

5. The spread system of claim 4, wherein at least one of said bow members are flexible so as to exert a compliant bow force against the nearest sheet member as said film unit is advanced between said upper and lower bow members through said bow gap.

6. The spread system of claim 5, wherein said bow force exerted by said bow members and the configuration of said bow members is effected so that the force exerted on an advancing film unit is always insufficient to rupture the rupturable container of processing fluid thereby preventing the fluid contents of the rupturable container from being prematurely released before the rupturable container is advanced substantially through the nip of said spread rollers.

7. The spread system of claim 6, wherein said compliant bow force exerted by said bow is essentially zero pounds at said bow gap and increases at a predetermined rate in response to reactive forces exerted by said nearest sheet member advanced through said bow gap along the path of advancement.

8. The spread system of claim 1, wherein said third constraint means comprises a pair of juxtaposed upper and lower clamp members movably mounted to the housing resulting in a clamp gap there between said clamp members, said clamp members having linear portions extending transversely across the path of advancement of said film unit and between which said film unit is advanced.

9. The spread system of claim 8, comprising a biasing means for providing a compliant clamp force for at least one of said clamp members wherein said compliant clamp force is exerted on said nearest sheet member as said film unit is advanced between said upper and lower clamp members through said clamp gap.

10. The spread system of claim 9, wherein said compliant clamp force is preloaded by said biasing means whereby said compliant force is greater than zero pounds at said clamp gap and increases at a predetermined rate in response to reactive forces exerted by said nearest sheet member advanced through said clamp gap along the path of advancement.

11. The spread system of claim 9, wherein said biasing means also provides an assembled spring force on said upper spread rollers of approximately 10 pounds, wherein approximately 5 pounds are applied to each side of said upper spread roller.

12. The spread system of the claim 9, wherein said biasing means also provides an assembled spring force on said driven transfer roller of approximately 5 pounds, wherein approximately 2.5 lbs. are applied to each side of said driven transfer roller.

13. A portable imaging system comprising an electronic camera device for capturing image data and an electronic printer device for printing photographs, both of which are together disposed in a housing of a size that is conveniently carried by hand, wherein said printer device includes a processing fluid spread system for spreading the processing fluid of a self-processable film unit so that the film unit may be processed, said self-processable film unit is of the type including a pair of sheet elements and a rupturable container of the processing fluid positioned adjacent to a leading edge of the film unit, and wherein said printer device further includes a stationary print head suitable for emitting consecutive lines of image data on said film unit to expose said film unit while said film unit is advanced proximately to said print head, wherein said imaging system further comprises:

an interface connecting means operating to effect an electrical connection between said camera device and printer device;

memory storage means for said imaging system for storing the image data;

a microprocessor unit disposed in the housing, said microprocessor being responsive to user selection for acquiring image data via said camera device, said microprocessor operable to process said image data for memory storage and film unit exposure and processing; and means for advancing the film unit along a predetermined advancement path whereby the film unit is simultaneously exposed by said print head and processed by said spread system, wherein said spread system comprises:

means for spreading the processing fluid in a thin layer between the sheet elements, said fluid spreading means including a pair of elongated juxtaposed pressure applying members which define an elongated spreader gap through which the film unit is advanced by said advancement means with the sheet elements in superposed relationship to apply a first constraint to the film unit to first rupture the container to release the processing fluid and then to cause the released mass of processing fluid to flow downstream between the sheet elements opposite to the direction of advancement of the film unit through said spreader gap such that the processing fluid is progressively deposited between the sheet elements as a thin layer extending over a preselected area of the sheet elements which has been exposed by said print head;

means for applying a second constraint to selective portions of the film unit to oppose the flow of the processing fluid, received downstream from said spreading means, relative to the sheet elements as the film unit is advanced through said spreader gap so as to cause said processing liquid to flow transversely to said direction of advancement of the film unit; and means for applying a third constraint to selective portions of the film unit to oppose the flow of the processing fluid, received downstream from said second constraint means, so as to contain the wave front of the processing fluid within a predetermined longitudinal distance from said spreading means, thereby defining a wave extent, and to assist the transverse flow of the processing liquid by causing the processing liquid to coalesce or merge and flow transversely.

14. The spread system of claim 13 whereby said pressure applying members are also adapted for assisting the advancement of said film unit, wherein said pressure applying members comprise:

an upper spread roller and a lower spread roller rotatably mounted to said housing, said spread rollers are spaced apart to provide a spread nip for receiving the leading edge of said film unit received from said advancing means and for feeding said film unit between said pair of spread rollers.

15. The spread system of claim 13, wherein said second constraint means comprises a pair of juxtaposed upper and lower bow members mounted to the housing resulting in a bow gap there between said bow members, said bow members having linear portions extending transversely across the path of advancement of said film unit and between which said film unit is advanced.

16. The spread system of claim 15, wherein said upper and lower bow members are configured so that their center portions, corresponding with the medial portions of said film units, have a larger extension toward the other respective said bow member and their lateral portions, corresponding with the outer portions of said film units, have a smaller extension toward the other respective said bow member, whereby said configurations of said bow members result in the bow gap being narrowest in the center portions and being widest at the outer portions, said configurations of said bow members effecting the flow of the processing fluid in a wave front substantially parallel to said bow members in said transverse direction so as to cause the processing fluid to flow laterally.

17. The spread system of claim 16, wherein at least one of said bow members are flexible so as to exert a compliant bow force against the nearest sheet member as said film unit is advanced between said upper and lower bow members through said bow gap.

18. The spread system of claim 17, wherein said bow force exerted by said bow members and the configuration of said bow members is effected so that the force exerted on an advancing film unit is always insufficient to rupture the rupturable container of processing fluid thereby preventing the fluid contents of the rupturable container from being prematurely released before the rupturable container is advanced substantially through the nip of said spread rollers.

19. The spread system of claim 18, wherein said compliant bow force exerted by said bow is essentially zero pounds at said bow gap and increases at a predetermined rate in response to reactive forces exerted by said nearest sheet member advanced through said bow gap along the path of advancement.

20. The spread system of claim 13, wherein said third constraint means comprises a pair of juxtaposed upper and lower clamp members movably mounted to the housing resulting in a clamp gap there between said clamp members, said clamp members having linear portions extending transversely across the path of advancement of said film unit and between which said film unit is advanced.

21. The spread system of claim 20, comprising a biasing means for providing a compliant clamp force for at least one of said clamp members wherein said compliant clamp force is exerted on said nearest sheet member as said film unit is advanced between said upper and lower clamp members through said clamp gap.

22. The spread system of claim 21, wherein said compliant clamp force is preloaded by said biasing means whereby said compliant force is greater than zero pounds at said clamp gap and increases at a predetermined rate in response to reactive forces exerted by said nearest sheet member advanced through said clamp gap along the path of advancement.

23. The spread system of claim 21, wherein said biasing means also provides an assembled spring force on said upper spread rollers of approximately 10 pounds, wherein approximately 5 pounds are applied to each side of said upper spread roller.

24. The spread system of claim 21, wherein aid biasing means also provides an assembled spring force on said driven transfer roller of approximately 5 pounds, wherein approximately 2.5 pounds are applied to each side of said driven transfer roller.

25. A method for printing photographs including the steps of:

spreading processing fluid of a self-processable film unit using a spreading means so that the film unit may be processed, said self-processable film unit is of the type including a pair of sheet elements and a rupturable container of the processing fluid positioned adjacent to a leading edge of the film unit, emitting consecutive lines of image data on film unit using an electronic printing means to expose said film unit while said film unit is advanced proximately to an electronic print head, wherein said print head is stationary.

advancing the film unit by an advancing means along a predetermined advancement path whereby the film unit is simultaneously exposed by said print head and processed by said spread system, and wherein said spreading comprises:

spreading the processing fluid in a thin layer between the sheet elements using said spreading means, said spreading means comprises a pair of elongated juxtaposed pressure applying members which define an elongated spreader gap through which the film unit is advanced by said advancement means with the sheet elements in superposed relationship to apply a first constraint to the film unit to first rupture the container to release the processing fluid and then to cause the released mass of processing fluid to flow downstream between the sheet elements opposite to the direction of advancement of the film unit through said spreader gap such that the processing fluid is progressively deposited between the sheet elements as a thin layer extending over a preselected area of the sheet elements which has been exposed by said print head;

applying a second constraint to selective portions of the film unit to oppose the flow of the processing fluid, received downstream from said spreading means, relative to the sheet elements as the film unit is advanced through said spreader gap so as to cause said processing liquid to flow transversely to said direction of advancement of the film unit; and applying a third constraint to selective portions of the film unit to oppose the flow of the processing fluid, received downstream from said second constraint means, so as to contain a wave front of the processing fluid within a predetermined longitudinal distance from said spreading means, thereby defining a wave extent, and to assist the transverse flow of the processing liquid by causing the processing liquid to coalesce or merge and flow transversely.

* * * * *